US012671880B2

(12) United States Patent
Sanjeevan Cabeza

(10) Patent No.: US 12,671,880 B2
(45) Date of Patent: *Jun. 30, 2026

(54) METHODS AND SYSTEMS FOR DETECTING CONTENT WITHIN MEDIA STREAMS

(71) Applicant: VIZIO, INC., Irvine, CA (US)

(72) Inventor: Kiran Sanjeevan Cabeza, San Francisco, CA (US)

(73) Assignee: VIZIO, INC., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/896,515

(22) Filed: Sep. 25, 2024

(65) Prior Publication Data

US 2025/0039520 A1     Jan. 30, 2025

Related U.S. Application Data

(63) Continuation of application No. 17/903,754, filed on Sep. 6, 2022, now Pat. No. 12,132,972.

(60) Provisional application No. 63/278,415, filed on Nov. 11, 2021, provisional application No. 63/241,446, filed on Sep. 7, 2021.

(51) Int. Cl.
 *H04N 21/8352*     (2011.01)
 *H04N 21/845*     (2011.01)
(52) U.S. Cl.
 CPC ..... *H04N 21/8456* (2013.01); *H04N 21/8352* (2013.01)

(58) Field of Classification Search
 CPC ...................... H04N 21/8456; H04N 21/8352
 See application file for complete search history.

(56) References Cited

U.S. PATENT DOCUMENTS

| | | | | |
|---|---|---|---|---|
| 9,258,604 | B1 * | 2/2016 | Bilobrov | H04N 21/4821 |
| 11,516,522 | B1 * | 11/2022 | Gupta | H04N 21/233 |
| 11,538,461 | B1 * | 12/2022 | Gupta | G10L 15/16 |
| 11,854,564 | B1 * | 12/2023 | Chatlani | G10L 15/16 |
| 2016/0048723 | A1 | 2/2016 | Jeong et al. | |

* cited by examiner

*Primary Examiner* — Thai Q Tran
*Assistant Examiner* — Jose M Mesa
(74) *Attorney, Agent, or Firm* — DICKINSON WRIGHT RLLP; Hector A. Agdeppa

(57)     ABSTRACT

Systems and methods are provided for detecting a content type of content within a media stream. A computing device may receive a media stream and define a set of media segments that each represent a portion of the media stream. The computing device may identify a first media segment that includes a first boundary and a second media segment that includes a second boundary. The computing device may predict whether the subset of media segments that are positioned between the first media segment and the second media segment include content of a particular content type. The computing device may then transmit an indication of the prediction.

17 Claims, 11 Drawing Sheets

Training Data Database 408

Training Supervisor 404

Test Data Cache 412

Control

Output

AI Processor 120

400

| Time (s) | Content Prediction | Boundary Prediction |
|---|---|---|
| 29.5 | 0.1 | 0.1 |
| 30.0 | 0.2 | 0.9 |
| 30.5 | 0.9 | 0.2 |
| 31.0 | 0.8 | 0.1 |
| 31.5 | 0.9 | 0.2 |
| 32.0 | 0.8 | 0.0 |
| ... | ... | ... |
| 60.0 | 0.1 | 0.9 |
| 60.5 | 0.1 | 0.2 |

804

808

812

816a

Content
Detected

816b

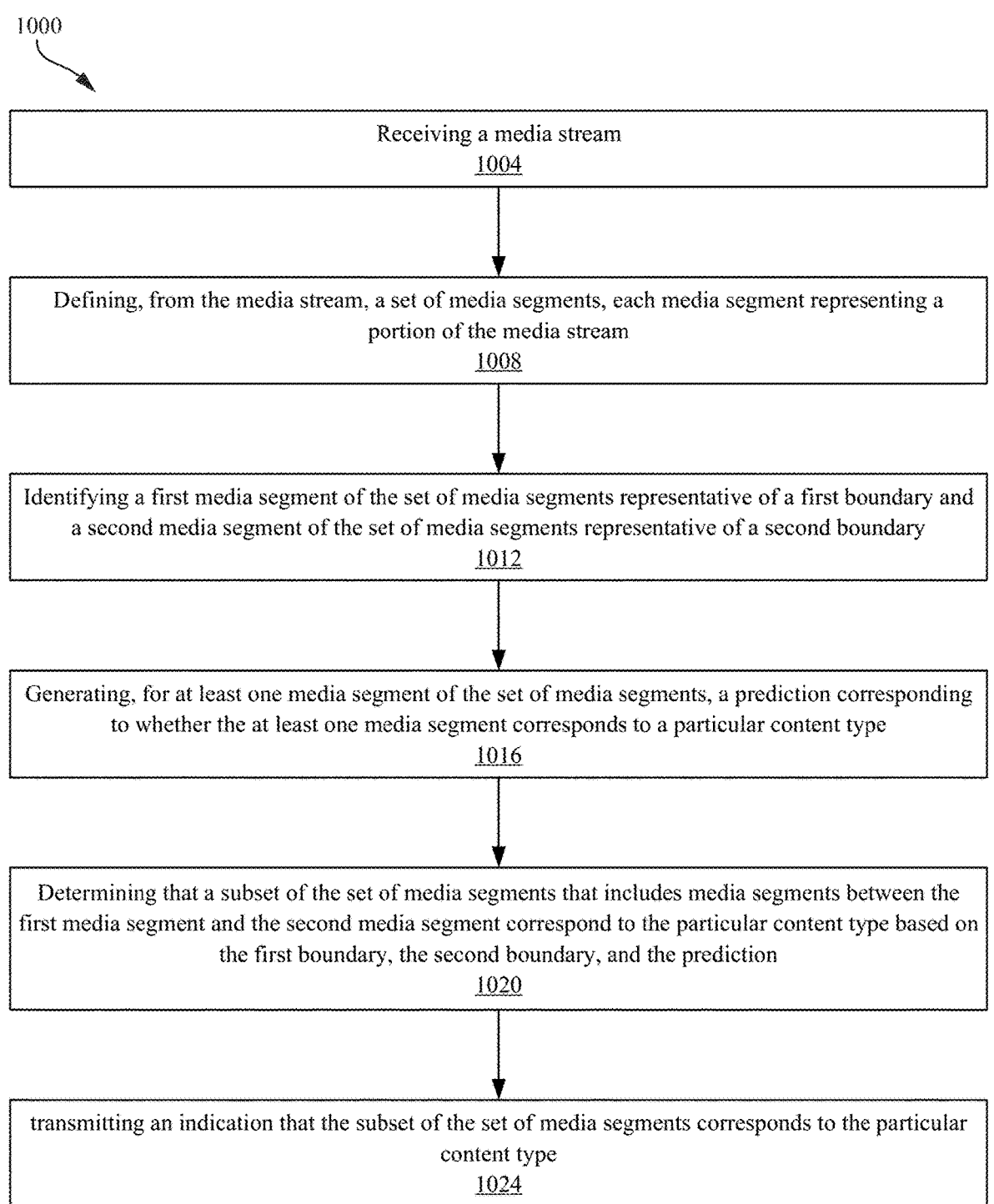

1000

Receiving a media stream
1004

Defining, from the media stream, a set of media segments, each media segment representing a
portion of the media stream
1008

Identifying a first media segment of the set of media segments representative of a first boundary and
a second media segment of the set of media segments representative of a second boundary
1012

Generating, for at least one media segment of the set of media segments, a prediction corresponding
to whether the at least one media segment corresponds to a particular content type
1016

Determining that a subset of the set of media segments that includes media segments between the
first media segment and the second media segment correspond to the particular content type based on
the first boundary, the second boundary, and the prediction
1020 transmitting an indication that the subset of the set of media segments corresponds to the particular
content type
1024

FIG. 10

METHODS AND SYSTEMS FOR DETECTING CONTENT WITHIN MEDIA STREAMS

CROSS-REFERENCE TO RELATED APPLICATIONS

This application is a continuation of U.S. patent application Ser. No. 17/903,754 filed Sep. 6, 2022, which claims the benefit of U.S. Provisional Application No. 63/241,446 filed Sep. 7, 2021, and U.S. Provisional Application No. 63/278,415 filed Nov. 11, 2021, the entire contents of each which are incorporated herein by reference in their entirety for all purposes.

TECHNICAL FIELD

This disclosure relates generally to detecting a content type corresponding to content within a media stream, and more particularly to various means to detect and identify content within a media stream.

BACKGROUND

Media devices display a variety of types of media from a variety of sources. Media devices use an identification of media sources or the content being displayed for authentication, security, to enable auxiliary functions of the media device, etc. For some media sources (e.g., cable box, over-the-air (OTA), streaming services, etc.), a media device may simply receive a media stream that includes the audiovisual data to present the media. As a result, the media device may not receive an identification of the content to be displayed. Even when the media can be identified, media streams often include other types of content embedded within the media that may not be related to the identified content and thus remain unidentified. For example, one or more advertisements may be included in the media stream for display at various intervals during presentation of a movie. The media device may be able to identify the movie (e.g., through metadata embedded with the movie media, broadcast channel, etc. or received from a content delivery network, broadcast network, etc.), yet not the identification of the advertisements or other media displayed during playback of the movie, thereby preventing the media device from implementing authentication, security, and/or other functions.

SUMMARY

Systems and techniques (e.g., methods or processes) are described herein for detecting content within media streams. An example method may include: receiving a media stream; defining, from the media stream, a set of media segments, each media segment representing a portion of the media stream; identifying a first media segment of the set of media segments representative of a first boundary and a second media segment of the set of media segments representative of a second boundary; generating, for at least one media segment of the set of media segments, a prediction corresponding to whether the at least one media segment corresponds to a particular content type; determining that a subset of the set of media segments that includes media segments between the first media segment and the second media segment correspond to the particular content type based on the first boundary, the second boundary, and the prediction; and transmitting an indication that the subset of the set of media segments corresponds to the particular content type.

An example system may include one or more processors and a non-transitory computer-readable medium storing instructions that, when executed by the one or more processors, cause the one or more processors to perform any of the methods as previously described.

Non-transitory computer-readable media are described herein for detecting content within media streams. An example non-transitory computer-readable mediums may store instructions which, when executed by one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 10 illustrates a flowchart of an example process for detecting a media type of media within a media stream according to aspects of the present disclosure

DETAILED DESCRIPTION

Figure 1:
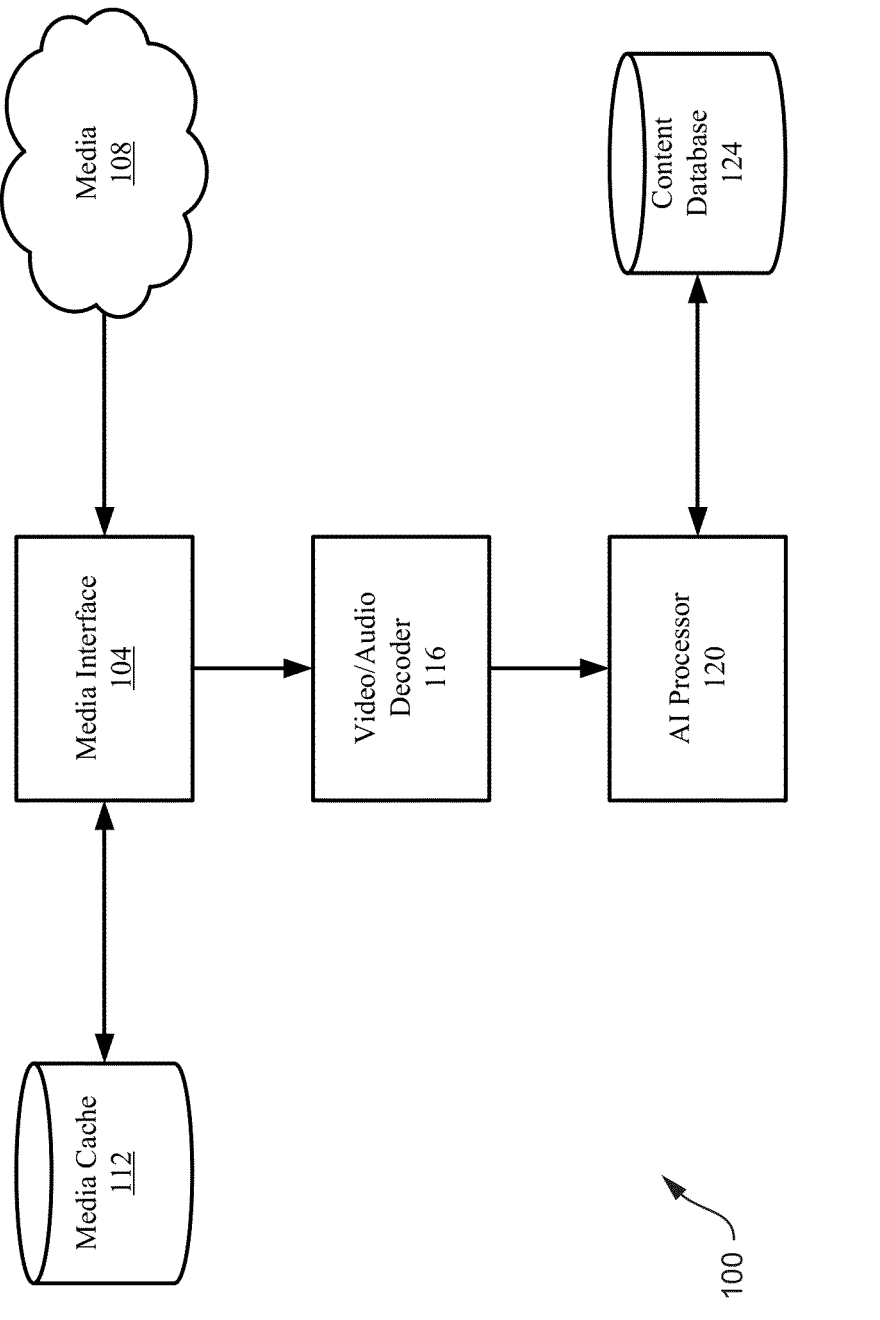
FIG. 1 depicts a block diagram of an example media identification system 100 for identifying a content type corresponding to content displayed within a media stream according to aspects of the present disclosure.

The present disclosure includes systems and methods for detecting content embedded within a media stream. Media devices may display a media stream (e.g., received from, for example, a streaming service, a set-top box such as from a cable network or content delivery network, over-the-air (OTA), internal or external memories, etc.) that can include a sequence of multiple types of content. For instance, the media stream can include a primary content, such as a video (e.g., a movie), and additional content (referred to herein as supplemental content, which may include content such as content related to the primary content, advertisements, or other supplemental content) embedded within the media stream. For example, the supplemental content may be dispersed at set intervals within the media stream. While the media device may receive or detect an identification of primary content being displayed using metadata associated with the media stream, user input (e.g., such as a request to receive the media stream, etc.), or the like, the media device may not receive an identification of the supplemental content embedded within the media stream. The media device may use other processes, such as those described herein, to distinguish the primary content from the supplemental content embedded into the media stream and to identify the supplemental content.

For instance, according to aspects described herein, the media device may first distinguish the portions of the media stream that correspond to the primary content from the portions of the media stream that correspond to the other content. In one illustrative example, the media device may process the media stream to identify boundaries within the media steam indicative of a transition from the primary content to the supplemental content or from the supplemental content to the primary content. A boundary may correspond to a set of frames that include a transition from a current content (e.g., the primary content, the supplemental content, etc.) being displayed to a blank frame (e.g., a frame having an average pixel value of approximately zero, a frame having an average pixel value of approximately 255, a frame having an average pixel value that is predetermined to be considered a blank frame, etc.), followed by a transition from the blank frame to the subsequent content of the media stream (e.g., the supplemental content, the primary content, etc.) to be displayed. In some instances, a boundary may be a single frame (e.g., the blank frame). In other instances, the boundary may include the transition to the blank frame and the transition from the blank frame.

In some cases, the media device may detect boundaries by first generating a sequence of media segments that each represent a portion of the media stream. The media device may execute a boundary detection process that assigns a label to each media segment indicating the presence (or absence) of a boundary in that media segment. The boundary detection process may evaluate characteristics of each media segment (e.g., the video frames of the media segment, the audio component, etc.) to determine a probability that the media segment includes a boundary. For example, if evaluating the video frames, the media device may compare pixel values of one or more adjacent video frames to identify one or more blank frames, video frames corresponding to a fade-to-black (e.g., a sequence of video frames having an decreasing average pixel values with a last video frame having an average pixel value of approximately zero), video frames corresponding to a fade-from-black (e.g., a sequence of video frames having an increasing average pixel values with a first video frame having an average pixel value of approximately zero), combinations thereof, or the like, which may correspond to a boundary. The media device may generate the probability based on a confidence associated with the detection of the blank frame, the fade-to-black, the fade-from-black, and/or the like. In another example, the media device can process the audio component to detect a boundary (e.g., via a frequency analysis, amplitude analysis, spectral analysis, etc.). The media device may generate the probability based on a confidence associated with the detection of the boundary.

Alternatively, or additionally, the media device may use a machine learning system or model (e.g., a neural network such as a convolutional neural network (CNN), recurrent neural network (RNN), or other type of machine learning system or model) to generate the probability that a media segment includes a boundary. For instance, a neural network may process the media or any portion thereof (e.g., combined video and audio components, the video component, or the audio component) to determine the probability of the boundary being present in a media segment.

If the probability associated with a detected boundary (e.g., detected using any of the aforementioned methods) is greater than a threshold probability, then the media device labels the media segments as including a boundary. If the probability is less than the probability threshold, then the media device labels the media segments as not including a boundary.

The media device may then categorize a content type that corresponds to the content of the media stream that is between two boundaries. The content type categories include, but are not limited to primary content (e.g., the content selected by a user of the media device such as a movie, television program, music, etc.), supplemental content (e.g., content interspersed or embedded within the primary content such as, but limited to, commercial, popup, advertisement, watermarks, etc.), or the like. The media device may use features of the content being displayed to determine the content type. When a boundary is detected, the media device may compare features extracted from the media stream before the boundary and after the boundary to determine if the content being displayed has transitioned to different content. Examples of features can include, but are not limited to, average pixel values, average brightness, difference between the current average pixel values and the average pixel values of one or more frames displayed before the boundary, difference between the current brightness values and the brightness values of one or more frames displayed before the boundary, audio volume, audio frequency, changes in audio volume, changes in audio frequency, metadata embedded into the media stream, or the like.

In some instances, the media device may use a machine learning system or model (e.g., a neural network such as a convolutional neural network (CNN), recurrent neural network (RNN), or other type of machine learning system or model) to identify the content type. The machine learning system or model may generate a probability indicative of whether the media segments positioned between the boundaries correspond to a particular content type category. The media device may derive a single probability from the probabilities of the media segments for use in determining the content type. For instance, the media device may generate an average probability from the set of probabilities. If the average probability is greater than a threshold probability, then the media device may determine that the media segments between the two boundaries includes content that corresponds to the particular content type category output from the machine learning system or model. If the single probability is less than the probability threshold, then the media device may determine that the media segments between the two boundaries includes content that does not corresponds to the supplemental content.

In some instances, the media device may use the time interval between each sequential pair of boundaries to further improve the determination of the content type category. Primary content may be displayed over longer time intervals than the supplemental content types embedded with the primary content. Some content type categories include content that is presented over standard time intervals. For example, commercials may be presented between approximately thirty seconds and two minutes. If the time interval between the two boundaries is greater than a threshold time interval (e.g., two minutes), then the media device may determine that the detection of content corresponding to a non-primary content type category may be a false positive. The threshold time interval may be selected based on user input, an expected maximum duration of supplemental content expected to be embedded into primary content, a machine learning system or model (e.g., one of the aforementioned machine learning system or model or a different machine learning system or model), a statistical analysis (e.g., such as a regression analysis, etc.) of historical time intervals of supplemental content in this media stream or other media streams, combinations thereof, or the like.

The media device may store the content type identification and/or report the content type identification to one or more remote servers. The media device or the remote server may then identify the content of the media segments determined to be of the supplemental content type. In some instances, an identification of the content can be determined by automated content recognition (ACR) processes by, for example, comparing aspects of the content to a reference database of identified content. If the aspects of the content match an entry in the reference database, the entry may be used to identify the content. In some instances, the aspects of the content can include one or more frames, pixel data extracted from one or more frames, a cue point, audio data, and/or the like.

Once identified, the content corresponding to the supplemental content type can be tracked by the media device and/or the remote server. The remote server may generate reports indicating a quantity of instances in which the particular content was presented by the media device, the quantity of media devices that presented the particular content, demographic information associated with the media devices that displayed the particular content, and/or the like. In some instances, identifying the content may enable additional functionality of the media device. For example, upon identifying the particular content, the media device may be configured to present related content, present additional information related to the particular content (e.g., information about products/services, actors, production personnel, sets or settings, etc.), replace content to be present with supplemental content, provide user interfaces to a user of the media device related to the particular content, and/or the like.

FIG. 1 depicts a block diagram of an example media identification system 100 for identifying a content type corresponding to content displayed within a media stream according to aspects of the present disclosure. Media identification system 100 can detect and identify particular media within a media stream. In some instances, media identification system may be one or more devices (e.g., computing devices, servers, databases, etc.) that receive media streams and report the identification of particular media within those media streams. For example, media identification system may be positioned along a signal path between a content source (content delivery network, media server, media network, media database, etc.) and media devices to identify media being presented to media devices. Media device may include any device configured to display media directly (e.g., such as a television, mobile device, computing device, etc.) or devices configured to enable another device to display media directly (e.g., such as a set-top box, or the like). In other instances, media identification system 100 may be a component within a media device (e.g., a set-top box, display device such as a television, etc.) or another device. In still yet other instances, media identification system 100 may operate within a cloud environment as a distributed set of processes operating on any of one or more devices within the cloud environment.

Media identification system 100 can receive media through media interface 104. Media streams may be received media 108, which may include one or more devices or networks that distribute media (e.g., the Internet, content delivery networks, broadcast television networks, cable television networks, satellite television networks, etc.). The media may be transmitted using a protocol that may be selected by the particular media source. As a result, some media streams may be transmitted in different protocols than other media streams. For example, broadcast television transmitted over-the-air (OTA) may be transmitted in a different format and protocol from cable television. Media interface 104 may include a set of interfaces configured to receive incoming media streams in a variety of protocols and if needed, translate the media streams into a protocol that other components of media identification system 100 can utilize. Media interface 104 may detect a particular protocol being used by a media source (e.g., media 108) and identify a particular interface within media interface 104 to receive the media stream.

Media interface 104 may store portions of received media streams in media cache 112 before outputting the portions of the received media streams to other components of media identification system 100. For instance, media cache 112 may operate as a buffer that ensures media identification system 100 stores enough of a media stream to detect and identify the media of the media stream. In another instance, media cache 112 may operate as a load balancer storing the received portions of multiple streams to reduce the load on other components of the media indication system 100. The received portions of the media streams may then be processed at a later time or at a more efficient rate. Media may be stored in media cache 112 to improve operations of media interface 104 (e.g., machine-learning models or the like), to test the received media streams (e.g., for the integrity of the processed media stream, error detection, error correction, etc.), to perform additional processing on the media stream, combinations thereof, or the like Media interface 104 may output portions of the received media stream to video/audio decoder 116, which may be configured to decode media of the media stream. For instance, media streams may be encoded for transmission to remote media devices. Encoding can include formatting the media stream, applying compression algorithms, etc. Video/audio decoder 116 may include one or more codecs that are configured to decode data encoded using a similar corresponding codec. Video/audio decoder 116 may analyze the media and/or the isolated video and audio components of the media stream. Video/audio decoder 116 may then identify codecs configured to decode the media stream and/or the video and audio components.

Video/audio decoder 116 may store codecs in a database of codecs. The database may store codecs that may be frequently employed by media sources. Video/audio decoder 116 may query the database to identify a particular codec to decode a particular media stream (and/or the separate video or audio components). If the query returns a null result (e.g., the particular codec could not be identified), then video/audio decoder 116 may retransmit the query to an external device or network that may retrieve the particular codec for video/audio decoder 116. Video/audio decoder 116 may output the decoded media stream to artificial-intelligence (AI) processor 120.

AI processor 120 may execute using the decoded media (e.g., the video component of the media, the audio component of the media, the combined audio/video, a component of the media, etc.) to detect a media type within a media stream. For example, AI processor 120 may distinguish between a movie, a commercial or other advertisement, a television show, supplemental content, etc.). AI processor 120 may detect the media type using one or more machine-learning models. For example, the AI processor 120 may use a neural network such as convolutional neural network, recurrent neural network, recurrent convolutional neural network, combinations thereof, or the like. In some instances, AI processor 120 may include a processing pipeline of machine-learning models.

The processing pipeline may include a media sampler that can define media segments from the decoded media stream. The media sampler may output a set of media segments with each media segment corresponding to a portion of the decoded media stream. Each media segment may correspond to a predetermined time interval of the media stream. For instance, each media segment may correspond to a 500-millisecond portion of the media stream. In some instances, the media sampler may define a set of media segments from the media stream that includes the entire media stream. For example, each discrete 500-millisecond portion of the media stream may correspond to a media segment of a set of media segments. In other instances, the media sampler may identify a portion of the decoded media from which to define media segments to reduce a quantity of media segments defined by the media sampler. For instance, the media sampler may analyze the decoded media stream to identify particular portions of the decoded media stream that are likely to include a particular media type, a different media type from a previous set of media segments, properties of interest, etc.

In some instances, the media segments from the set of media segments may represent a unique portion of the decoded media stream. For example, a first media segment may correspond to the portion of the decoded media stream between t=0 to t=0.5 and a next media segment may correspond to the portion of the decoded media stream between t=0.5 to t=1. In other instances, the media segments may be defined from overlapping time intervals. For example, a first media segment may correspond to the portion of the decoded media stream between t=0 to t=0.5 and a next media segment may correspond to the portion of the decoded media stream between t=0.1 to t=6. The set of media segments may be converted into the frequency domain using a Fourier transform or the like. In those instances, AI processor 120 may define a window size attribute (e.g., the predetermined time interval length) and a step size attribute (e.g., corresponding to the time interval between the start of one media segment and the start of a subsequent media segment). The window size attribute and the step size attribute may be received from user input, from a remote server, by the AI processor 120 (e.g., based on accuracy metrics of machine-learning models within AI processor 120, or the like).

AI processor 120 may convert the media segments from a time domain into a frequency domain. In some instances, AI processor 120 may execute a Fourier transform (or a Fast Fourier transform, or the like). The Fourier transform may be used to identify the sinusoidal frequency and phase content of media segments. The transformed media segments may be represented by a spectrogram.

Alternatively, instead of defining media segments and converting the media segments into the frequency domain, AI processor 120 may execute a short-time Fourier transform (STFT). The STFT may be a discrete process that performs the aforementioned functions of defining media segments and converting those media segments into the frequency domain. The STFT may receive the media stream and a window value (e.g., the predetermined time interval) as input. The STFT may then define media segments from the decoded media stream that correspond to the window value and outputs spectrogram representation of the media segments. In particular, the STFT may use a short-term power spectrum of a component of the media stream (e.g., audio, video, etc.), based on a linear cosine transform of a log power spectrum on a nonlinear mel scale of frequency. The STFT may output, in addition to the spectrographic representation of the media segment, mel-frequency cepstral (MFC) coefficients.

AI processor 120 may pass each transformed media segment as input into a first machine-learning model to generate a feature vector for the media segment. In some instances, the first machine-learning model may be a neural network such as a concurrent neural network that outputs a two or three-dimensional feature vector from the spectrograph. The neural network may include three or more layers: an input layer, one or more hidden layers, and an output layer. In some instances, the neural network may be a convolutional neural network. The output of the neural network may be a feature set per frequency of a media segment in the frequency domain. The feature sets may be added to the spectrogram output to generate a tensor (e.g., a feature vector) with an additional dimension added to the MFC coefficients. The tensor corresponds to a feature set by frequency by time sequence from the media segment being processed.

AI processor 120 may process the feature vector using one or more additional machine-learning models each being configured to generate a different output. For example, AI processor 120 may include a second machine-learning model configured to detect boundaries (e.g., a transition such as change in content) within the media segment from the feature vector and a third machine-learning model configured to detect a content type of a media segment. In some instances, the second and third machine-learning models may be recurrent neural networks such as long-short term memory (LSTM) models. LSTM models are configured to consider time series input (e.g., such as media segments that correspond to a predetermined time interval of the decoded media stream) when generating an output.

The second and third machine-learning models may be configured to receive input in a particular format. For instance, LSTM models may be configured to receive a two-dimensional input. Since the output of the first machine-learning model is a three-dimensional feature vector, AI processor 120 may unfold and reshape the three-dimensional feature vector to form a two-dimensional feature vector (e.g., or otherwise generate a feature vector of a format suitable for the second and third machine-learning models) that can be passed as input into the second and third machine-learning models. The three-dimensional feature vector may be unfolded by stacking the third-dimension of the feature vector onto the second-dimension of the feature vector (e.g., appending the feature set of each frequency with the features of the third-dimension of the frequency). The unfolded feature vector is then reshaped in strides of a particular length (e.g., such as predetermined time interval or window value as previously described). The unfolded feature vector may be two-dimensions, which can be represented as an x-dimension and a y-dimension, where the x-dimension (representing time) includes k values.

The unfolded and reshaped feature vector may then be passed as input into the second machine-learning model and the third machine-learning model. The second and third machine-learning models may be configured to detect boundaries and a media type (respectively). In some instances, the second and third machine-learning models may be LSTM models. LSTM models may include two or more layers of LSTM cell with forward and backward propagation. In some instances, the LSTM models may include $2^n$ cells where n may be determined based on user input, historical execution of the LSTM models, another machine-learning model, a feature extracted or derived from the decoded media stream, combinations thereof. In one example, the LSTM may include 64 cells. In another example, n may be based on a feature extracted from the media segment corresponding to a quantity of frequencies represented by the reshaped feature vector.

The cells of the LSTM models may receive three or more inputs that may be processed by the cell to generate an output. For example, the LSTM may receive a state input corresponding to the state of the LSTM based on the processes of previously executed cells, a hidden layer input based on the output of the previous cell, and the current input (e.g., the set of features of the feature vector at the $i^{th}$ position of the x-dimension). The cell processes the current input and hidden layer input and generates a hidden layer output and determines whether and how to modify the state input. The cell then outputs the updated state input and the hidden layer output to the next cell. After the $2^{nth}$ cell, the state and hidden layer output from the last cell may be passed through an output layer to generate a prediction output. The prediction output may be passed through a SoftMax algorithm to cause the prediction output to be represented as a value between 0 and 1.

AI processor 120 may then determine if the decoded media stream includes a particular media type by evaluating the predictions generated by the one or more machine-learning models. If AI processor 120 includes a single additional machine-learning model (e.g., a machine-learning model configured to detect a particular content type from the feature vectors), AI processor 120 may determine if a particular content type is detected when a predetermined quantity of successive predictions from the machine-learning model average to a value that is greater than a threshold. AI processor 120 may output an indication that the particular media type was detected and indicate the time interval within the media stream in which the particular media type was present.

If AI processor 120 includes two additional machine learning models (e.g., a second machine-learning model configured to detect boundaries in the decoded media stream and a third machine-learning model configured to detect a particular content type within the decoded media stream), AI processor 120 may identify a time interval between two sequential boundaries. Each boundary may be detected based on probabilities output from the second machine-learning model being greater than a first threshold. AI processor 120 may then determine if the average of the probabilities from the third machine-learning model output over the time interval between the sequential boundaries is greater than a threshold. If so, then AI processor 120 may indicate that media corresponding to the particular content type is detected and output a time interval within the media stream over which the media corresponding particular content type was presented.

AI processor 120 may output each detection of media corresponding to the particular content type to content database 124. In some instances, AI processor 120 may output an indication that media corresponding to the particular content type was detected, an indication of the time interval within the media stream in which the media corresponding to the particular content type was presented, an identification of the media corresponding to the particular content type, an isolated instance of the media corresponding to the particular content type from the media stream, a portion of the media corresponding to the particular content type from the media stream (e.g., such as a video frame, and audio segment, a pixel representation of a video frame or of the media corresponding to the particular content type, etc.).

Figure 2:
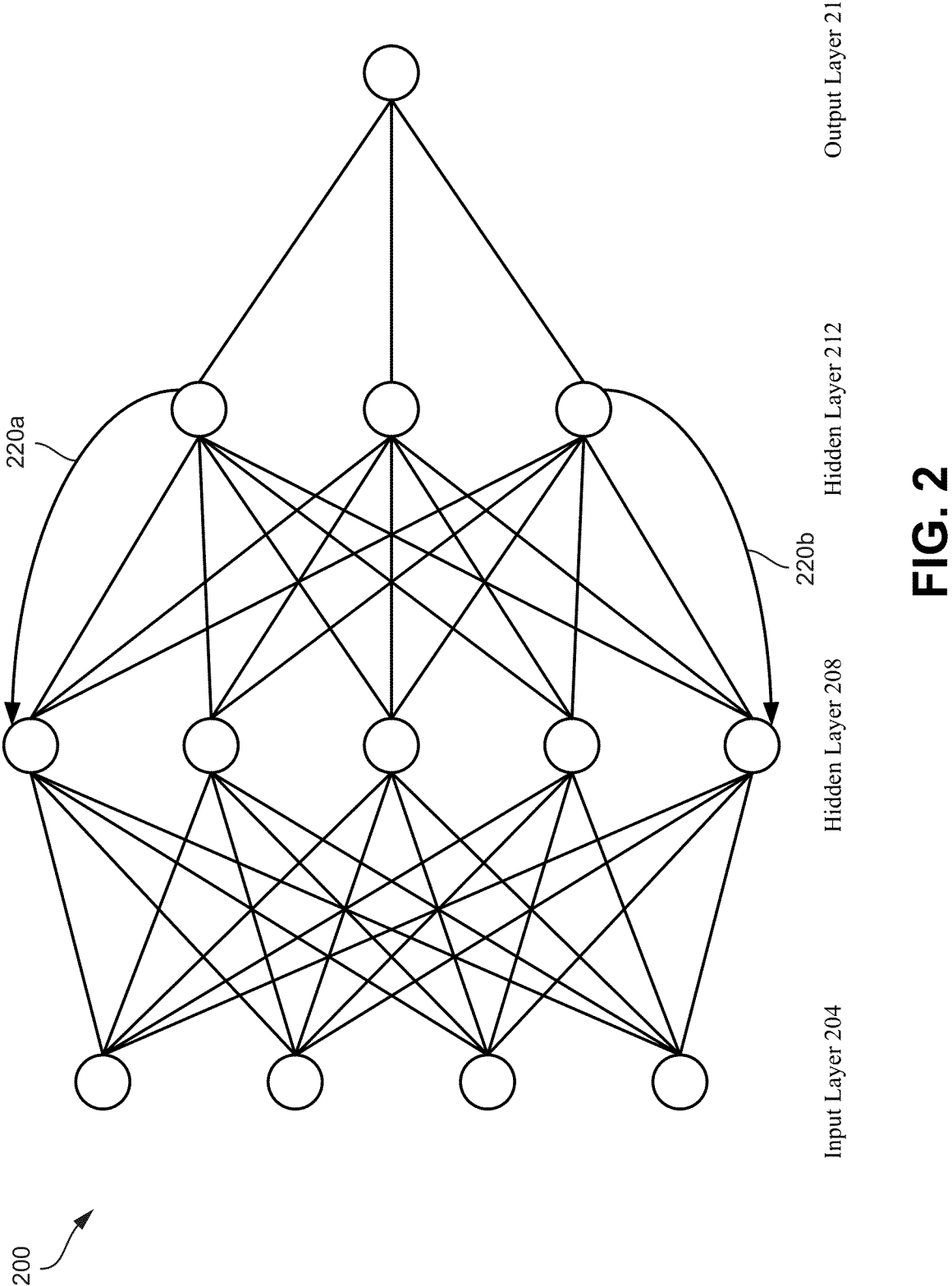
FIG. 2 illustrates a block diagram of an example neural network configured to predict boundaries or a particular content type within a media stream according to aspects of the present disclosure.

FIG. 2 illustrates a block diagram of an example neural network configured to predict boundaries or a particular content type within a media stream according to aspects of the present disclosure. Neural network 200 may be a recurrent neural network configured to process time series input. The input may include a two-dimensional feature vector derived from a media stream, the audio component of the media stream, the video component of the media stream, or other component of the media stream. The neural network may include an input layer 204, a first hidden layer 208, a second hidden layer 212, and an output layer 216. In some instances, the neural network may include additional hidden layers than those shown by neural network 200.

In a recurrent neural network configuration, neural network 200 may include feedback in which output from a hidden layer may be passed to a previous hidden layer of neural network 200. For instance, hidden layer 212 may pass feedback 220a and 220b to the previous hidden layer 208. Feedback 220a and 220b may enable neural network 200 to retain past information when processing temporal information. For example, processing time-series data such as audio date, a feature vector corresponding to time, t, may be processed by neural network 200. The neural network learns from processing the feature vector using backwards propagation through time in which modifies the weights of a previous layer of the neural network based on an output error value. As shown, neural network may use feedback 220a and 220b to modify weights of nodes in the previous layer (e.g., hidden layer 208). Backwards propagation through time may also adjust weights of input values processed during a previous iteration (e.g., from the feature vector input at time t−1). In some instances, neural network 200 may also use gradient decent to improve the accuracy of node weights. Gradient decent may use local minimums (e.g., in a neighborhood of a node) to determine node weights and/or adjustments to node weights. The recurrent neural networks described herein may use backwards propagation, background propagation through time, gradient decent, gates (e.g., usably by nodes of a long-short term memory network), and/or other learning processes to improve the accuracy, training, training time, etc. of the networks.

Figure 3:
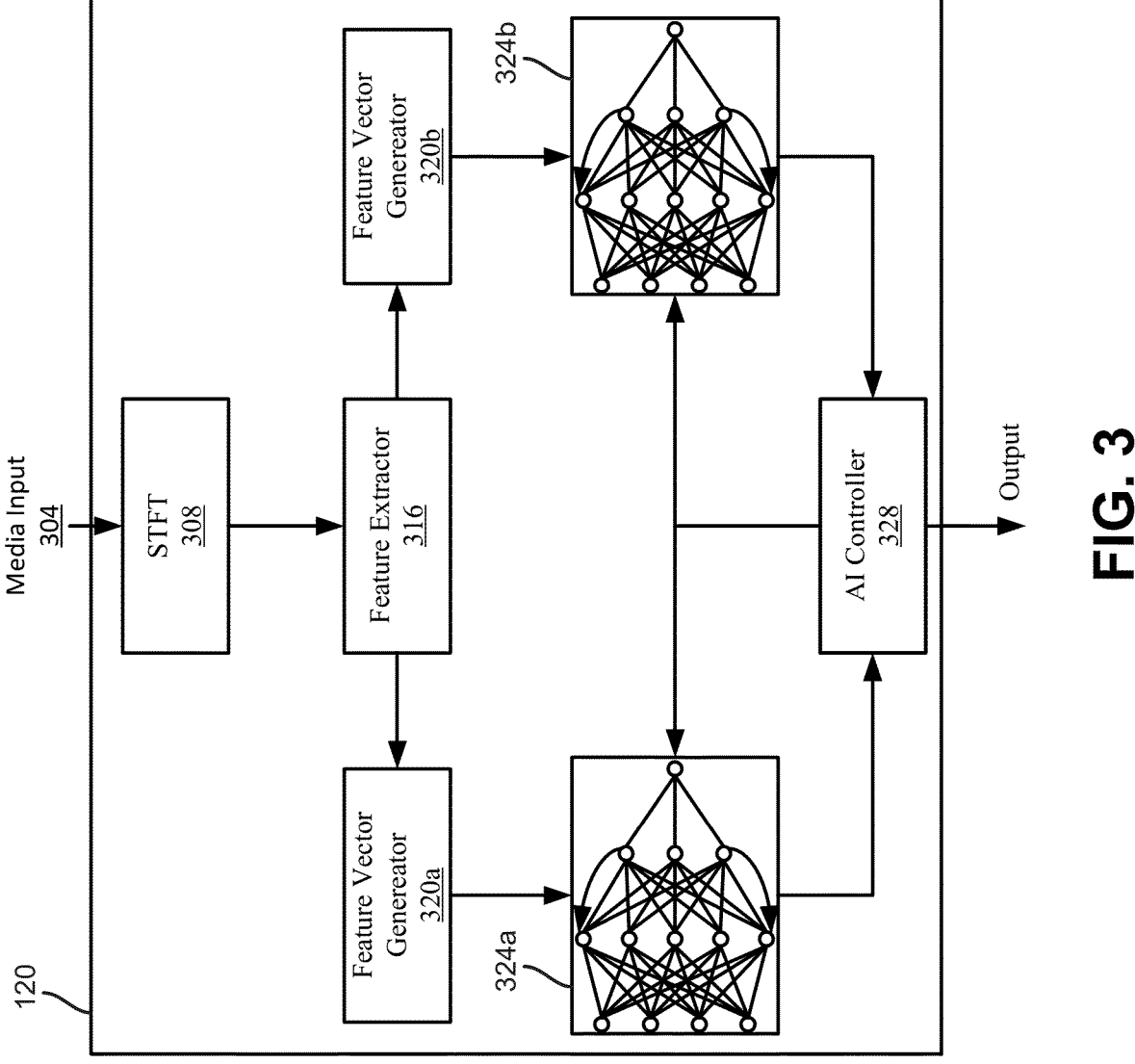
FIG. 3 illustrates a block diagram of an example AI processor configured to detect media within a media stream according to aspects of the present disclosure.

FIG. 3 illustrates a block diagram of an example AI processor configured to detect media within a media stream according to aspects of the present disclosure. AI processor 120 may receive media input 304. The media input may include, but is not limited to a media stream, a portion of a media stream, a component of a media stream (e.g., such as the video component, the audio component, other components, and/or the like), metadata associated with the media input, combinations thereof. In some instances, a media stream may include one or more media (e.g., audio and/or video) presented within a communication channel configured for presentation by a device. Examples of media streams include, but are not limited to, a broadcast television channel, cable television channel, Internet media, and/or the like. Since the media stream may include different types of media, AI processor 120 may be used to detect a content type of media included in the media stream. In some instances, AI processor 120 may be further configured to identify the content (e.g., using automated content recognition, or the like).

AI processor 120 may process media input 304 using STFT 308. STFT 308 may define a set of media segments from the media input. If the media stream is continuous, then STFT 308 may continuously generate media segments for the set of media segments. STFT 308 may then convert the set of media segments into the frequency domain (e.g., using a Fourier-based transform, or the like).

AI processor 120 may pass the media segments to feature extractor 316 to extract features that may be passed as input to machine-learning models 324a and 324b. In some instances, feature extractor may be an automated process that derives features from properties and characteristics of each media segment. In other instances, feature extractor may be a machine-learning mode. For instance, feature extractor 316 may be a neural network such as convolutional neural network that may process a media segment and output a set of features or a feature vector. The neural network may include three or more layers: an input layer, one or more hidden layers, and an output layer. In a convolutional neural network configuration, the neural network may include kernel used to convolve the input to a node of the neural network. In some instances, the kernel may be a 3×3 kernel. In other instances, the kernel may be of any size including single row or single column sizes.

Feature extractor 316 may output a set of features or a feature vector. In some instances, the output may be incompatible with the next processing layer (e.g., neural networks 324a and 324b). For instance, feature extractor may output a three-dimensional feature vector while the next processing layer may be configured to receive a two-dimensional input. Feature vector generator 320a may receive the input from feature extractor 316 and may generate a feature vector compatible with the next processing layer of AI processor 120. For example, feature vector generator 320a may unfold and reshape the three-dimensional feature vector to form a two-dimensional feature vector (e.g., or otherwise generate a feature vector of a format suitable for the neural networks 324a and 324b). The three-dimensional feature vector may be unfolded by stacking the third dimension of the feature vector onto the second dimension of the feature vector (e.g., appending the feature set at each frequency with the features of the third-dimension of that frequency). The unfolded feature vector may then be reshaped in strides of a particular length (e.g., such as predetermined time interval or a length of the media segment or the like). The unfolded feature vector may be two-dimensions, which can be represented as an x-dimension and a y-dimension, where the x-dimension (representing time) includes k values and each value along the x-dimension (e.g., from x=0 to x=k) corresponds to a set of features in the y-dimension.

The feature vector generated by feature vector generator 320a may be passed as input to neural network 324a and the feature vector generated by feature vector generator 320b may be passed as input to neural network 324b. In some instances, the feature vectors generated by feature vector generator 320a and by feature vector generator 320b may be the same (e.g., approximately identical). In other instances, the feature vectors generated by feature vector generator 320a and by feature vector generator 320b may be different based on neural network 324a and neural network 324b, respectively. For example, since neural network 324a may be trained to predict whether a media segment includes a boundary and neural network 324b may be trained to predict a content type of content of the media segment, the input feature vectors may differ. The differences may be minor (e.g., the inclusion of exclusion of one or more features, or the like).

The respective feature vectors may be passed to neural network 324a and 324b respectively. Neural networks 324a and 324b may be neural networks configured to process time-series input. For example, neural networks 324a and 324b may be recurrent neural network such as, but not limited to, long-short term memory networks. Neural networks 324a and 324b may be a same or different type of neural network. Neural network 324a may be configured to predict the presence of a boundary in the media segment from which the input feature vector was derived. The prediction may be a probability that such a boundary is present. The probability may be represented by a value between zero and 1, a percentage between 0 and 100, and/or the like. A boundary may correspond to a contextual transition in the media stream such as, for example, a transition from a first media type (e.g., a movie, etc.) to a second media type (e.g., an advertisement, etc.) or from the second media type to the first media type. Neural network 324b may be configured to predict a content type of content of the media segment. The prediction may be a label (e.g., of a content type), a probability that a particular content type is present, and/or the like.

AI controller 328 may receive the output from neural networks 324a and 324b and determine when a particular content type is detected. AI controller 328 may determine when a boundary is detected from the probabilities output from neural network 324a and when a particular content type is detected from the probabilities out from neural network 324b. In some examples, AI controller 328 may define a first threshold, which may be used to determine when a boundary probability output from neural network 324a is indicative of a boundary. AI controller 328 may define a second threshold, which may be used to determine when a content type probability output from neural network 324b is indicative of a particular content type. In other instances, the first threshold and the second threshold may be predefined, determined a machine-learning model (e.g., any of the previously described neural networks, or the like), by user input, and/or the like. The first and second thresholds may be static (e.g., unchanging) or dynamic (e.g., may change after each execution of AI processor 120). In one example, the first threshold may be set to a probability between 85-95% and the second threshold may be set to a probability between 55-65%.

AI controller 328 may determine that a particular content type of content is present in the media stream by first detecting two boundaries. AI controller 328 may determine a first media segment in the set of media segments that includes a boundary (e.g., based on the feature vector corresponding to the media segment generating a probability that is greater than the first threshold) and a second media segment in the set of media segments that includes a boundary. The boundaries may be consecutive (e.g., there are no boundaries between them), though not necessarily adjacent (e.g., at least one media segment is positioned between the first media segment and the second media segment). AI controller 328 may then determine if the content type probabilities output from neural network 324*b* and corresponding to the subset of media segments that are positioned between the first media segment and the second media segment in the set of media segments, are greater than the second threshold. In some instances, AI controller 328 may determine that the particular media has been detected in the media stream when each probability (e.g., the probability generated from each media segment in the subset of media segments). In other instances, AI controller 328 may determine that the particular media has been detected in the media stream when the average of the probabilities of the subset of media segments is greater than the second threshold. In still yet other instances, AI controller 328 may determine that the particular media has been detected in the media stream when the median or mode of the subset of media segments is greater than the threshold.

AI controller 328 may then output an indication that the media stream includes content of the particular content type. In some instances, the output may include additional data associated with the content such as, but not limited to, an identification of a timing offset indicating a location within the media stream in which the content is located, an identification of the content (e.g., via automated content recognition, manual content recognition, and/or the like), information corresponding to actors of the content, information corresponding to production personnel (e.g., directors, editors, producers, etc.), information corresponding to the production of the content (e.g., such as setting, set, shooting locations, etc.), combinations thereof, or the like. In some instances, the output may also include a representation of the content (e.g., the portion of the media stream that includes the content).

Figure 4:
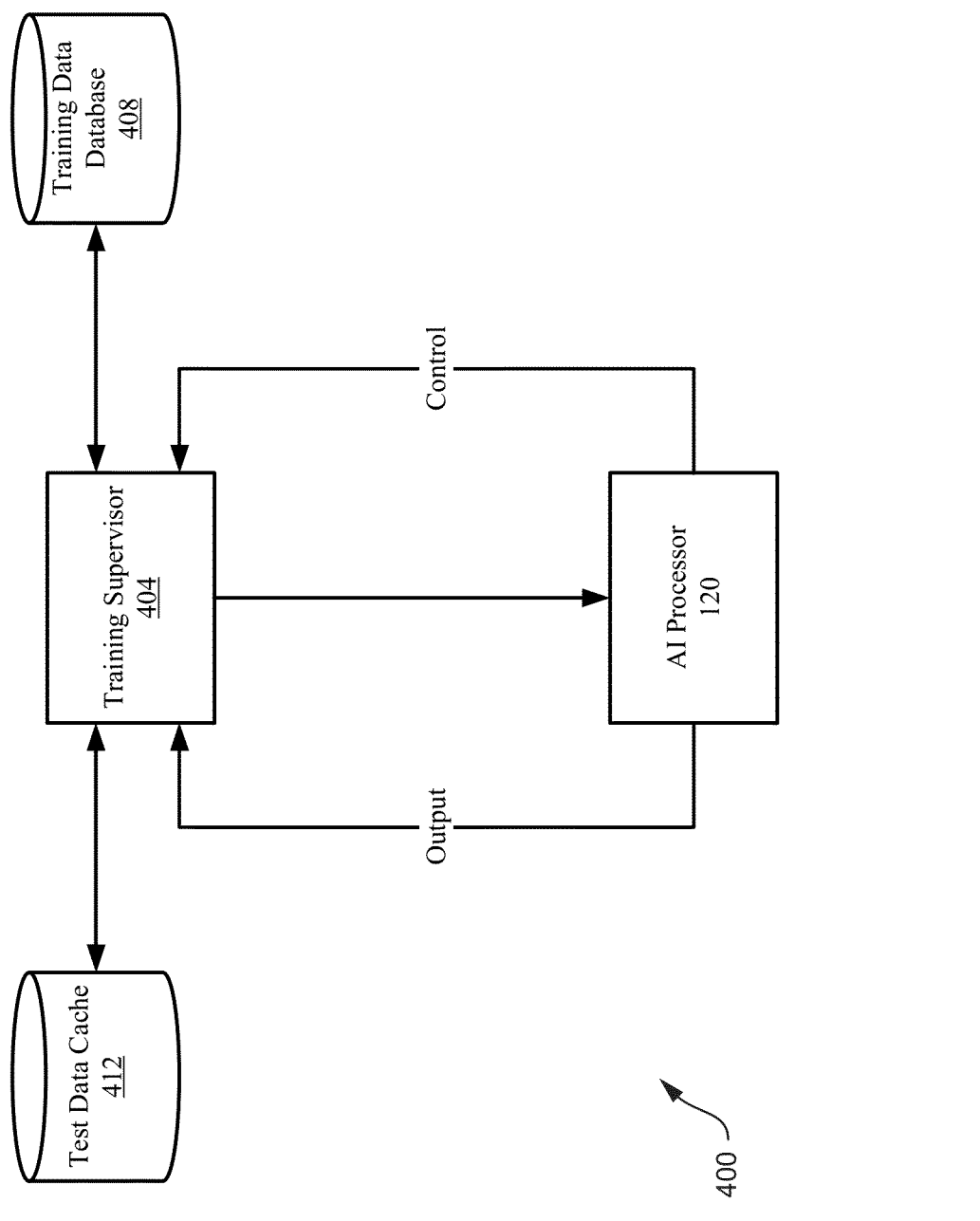
FIG. 4 illustrates a block diagram of an example training system configured to train an AI processor to detect media within a media stream according to aspects of the present disclosure.

FIG. 4 illustrates a block diagram of an example training system 400 configured to train an AI processor to detect media within a media stream according to aspects of the present disclosure. Training system 400 may train the one or more neural networks of AI processor 120. Training system may use training supervisor 404 to manage the training each neural network. Training supervisor may include one or more sets of hyperparameters for each neural network. Each set of hyperparameters may be based on a neural network type, learning type, algorithm, etc. Each hyperparameter may include one or more values that may control the learning process of the corresponding machine-learning model (e.g., epochs, loss functions, node weight adjustments, etc.).

Training supervisor may receive training data from database 408. Database 408 may include one or more local or remote databases that store historical media streams, media segments corresponding to the historical media streams, labels for media segments (e.g., indicative the presence of a boundary and/or the content type of the media segment, etc.), feature vectors corresponding to the media segments, combinations thereof, or the like. Database 408 may store data associated with each execution of AI processor 120 for future training (e.g., such as reinforcement learning) or retraining. In some instances, database 408 may store manually and/or procedurally generated training data. The manually and/or procedurally generated data may be based on historical media streams or current media streams for which the neural networks of AI processor 120 are being configured to process. Training supervisor 404 may organize the training data in database 408 into a set of training datasets for training, reinforcement learning, retraining, and/or the like.

Training supervisor 404 may receive test data from test data cache 412. Test data cache may store test data usable by training supervisor 404 or AI processor 120 to determine the status of the training processes, the accuracy of the neural networks being trained, to generate labels for supervised learning, and/or the like. Test data cache 412 may include data generated and/or derived from historical training data, manually generated training data, and/or procedurally generated training data from database 408. In some instances, test data cache 412 may also include data received from one or more remote devices (e.g., content delivery networks, servers, databases, computing devices, media devices, and/or the like).

Training supervisor may manage the training of the neural networks of AI processor 120 by passing each training dataset to AI processor 120. AI processor 120 may process the dataset (e.g., generating media segments, extracting features, generating feature vectors, and/or the like) and begin training a neural network. The output of each training iteration (e.g., each input passed into the neural network), may be passed from AI processor 120 to training supervisor 404 along with control signals (e.g., indicative of the training performed that iteration such as, but not limited to, output accuracy, node weights, etc.). Training supervisor 404 may analyze the output and control data to determine a subsequent iteration of training is to be performed. In some instances, training supervisor may use test data cache 412 to test the output and/or control data. In other instances, training supervisor 404 may perform a coverage analysis on the training data, the output, and/or on the control data to ensure that the training data is sufficient to train the neural networks and/or to identify the next training data to use for the next iteration of training. The neural networks may be training for a predetermined quantity of iterations and/or until a predetermined output accuracy is reached.

Training supervisor 404 may use supervised learning, unsupervised learning, self-supervised learning, and/or reinforcement learning. In supervised learning, each training input may include a label corresponding to an expected output. The neural network adjusts internal weights of nodes based on a difference between the output generated by the neural network and the label. In unsupervised or self-supervised learning, the training data may be unlabeled. The neural network may learn by analyzing the structure of the training data (e.g., correlations, etc.). The analysis may be fed back into the neural network to adjust the internal weights of the nodes.

In some instances, the neural network may be further trained using reinforcement learning. Reinforcement learning uses the output of the neural network and a desired result (e.g., an expected output, or the like). For example, the output of the neural network may be evaluated by a third neural network, user input, or the like. The output and the evaluation may be passed as feedback to the neural network to further adjust the node weights of the neural network. Reinforcement learning may occur during training of the neural network, during regular operation of the neural network (e.g., after the second neural network is trained), during retraining of the neural network, etc.

Figure 5:
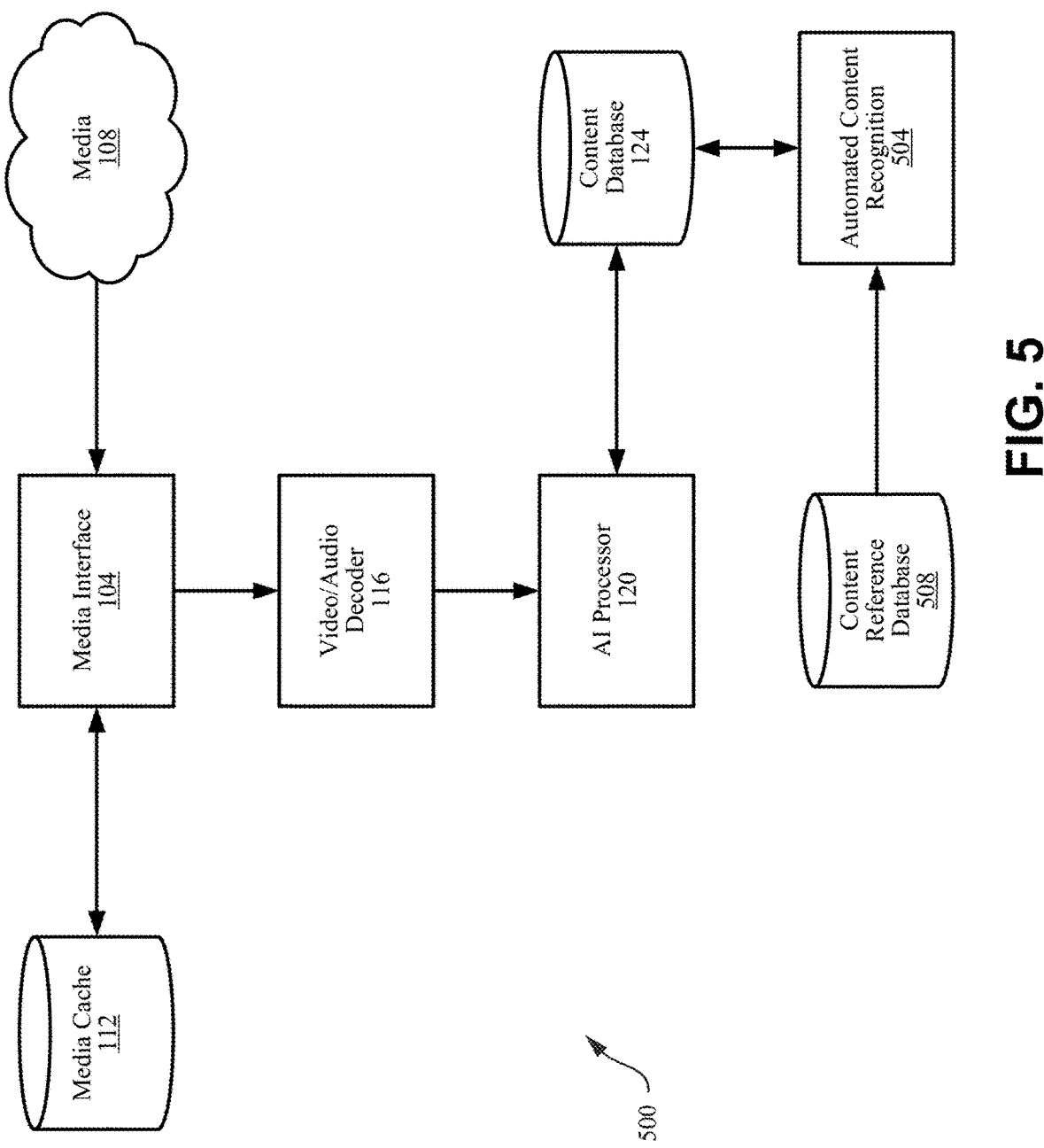
FIG. 5 illustrates a block diagram of an example media identification system configured to detect a media type of media within a media stream and to identify the media according to aspects of the present disclosure.

FIG. 5 illustrates a block diagram of an example media identification system configured to detect a media type of media within a media stream and to identify the media according to aspects of the present disclosure. Media identification system 500 may include media identification system 100 of FIG. 1. For instance, media identification system 100 may include media interface 104, media interface 104, media 108, media cache 112, video/audio decoder 116, AI processor 120, and/or content database 124. Media identification system 500 may be configured to identify content corresponding to the particular media type detected by AI processor 120. For instance, once AI processor 120 detects that content within a media stream corresponds to a particular content type, AI processor 120 transmits the indication to content database 124. The indication may include information associated with the content and/or the content type.

Content database 124 may transmit the indication to automated content recognition (ACR) 504. ACR 504 may match the content to a reference content in content reference database 508. If ACR 504 identifies a matching reference content, then the identifier of the reference content may be assigned to the content. ACR 504 may then transmit the identifier of the content back to content database 124 for storage or subsequent processing. In some instances, ACR 504 may also transmit an indication that the identified content has been presented. The indication that the identified content has been presented may include information associated with the media device that presented the content. The information can include, but is not limited to, hardware/software information of the media device, demographic information associated with users of the media device, other information associated with the users of the media device, etc.

Figure 6:
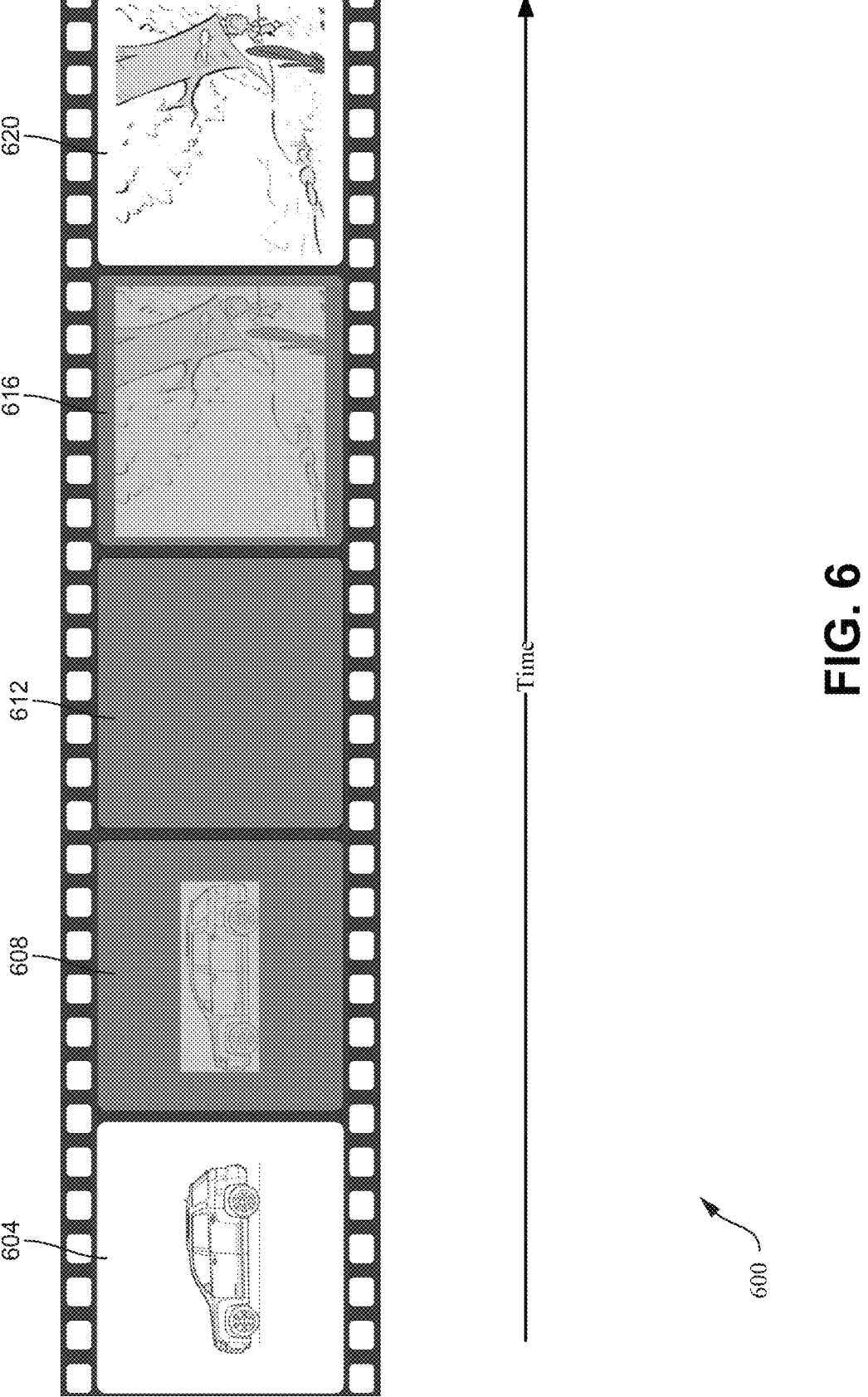
FIG. 6 illustrates an example boundary within a media stream according to aspects of the present disclosure.

FIG. 6 illustrates an example of a media segment 600 of a media stream that includes a boundary according to aspects of the present disclosure. Media segment 600 includes a portion of a media stream. Media segment 600 may include one or more video frames (as shown) and/or the audio component corresponding to the one or more video frames. Media segment 600 includes a boundary indicating a change from a first content to a second content. For example, video frame 604 represents content associated with a car. Video frame 604 may also represent the content associated with the car. The average pixel value of video frame 608 may be lower (e.g., darker) than video frame 604 due to the upcoming boundary video frame 612. Video frame 612 may be the boundary that corresponds to an empty video frame with an average pixel value of approximately zero (e.g., black) and not representing any content. Video frames 608 and 612 correspond to a fade-to-black process in which one or more video frames transition from content (e.g., video frame 604 and 608) to a boundary.

The next video frame (e.g., video frame 616), may have a similar average pixel value as video frame 608 and represent the next content (e.g., a wooded scene) in the media stream. Video frames 612 and 616 represent a fade-from-black process in which one or more video frames transition from a boundary to content (e.g., video frames 616 and 620). The last video frame of the media segment (e.g., video frame 624) may represent the new content.

Media segment 600, as shown, includes five frames. Yet, media segments may include any number of video frames and/or corresponding audio. In some instances, media segments may include a set of video frames and/or corresponding audio that corresponds to milliseconds of the media stream. In other instances, an AI processor (e.g., such as AI processor 120 of FIGS. 1-5), a user, and/or another component or device, may determine a window value that determines a quantity of video frames and/or corresponding audio to include in a media segment. The value may correspond to a quantity of video frames, a time interval length, or the like.

Media segments may be defined such that each media segment may include video frames and/or corresponding audio that is not included in other media segments defined from the media stream. For example, a first media segment may include video frames 604-620 such that video frames 604-620 may not appear in any other media segment. Alternatively, media segments may be defined to overlap such that a portion of the video frames and/or corresponding audio of the media segment may be included in a previous media segment and/or subsequent media segment. For example, a first media segment may include video frames 604-612, a second media segment may include video frames 612-620, a subsequent media segment may begin with video frame 620, and so on. A step value may be received that indicates a time interval between when a first media segment may be begin and when a next media segment begins. The step value may be less than or equal to the window value. When the step value is less than the window value, the media segments may overlap. When the step value is equal to the window value, the media segments may not overlap. In some instances, the step value may be greater than the window value. In those instances, each media segment may begin at some time after the end of preceding media segment within the media stream such that a portion of the media steam may not be represented by media segments. The time interval between the end of a media segment and the beginning of a subsequent media segment (that may not be represented by a media segment) may be equal to the difference between the window value and the step value.

Figure 7:
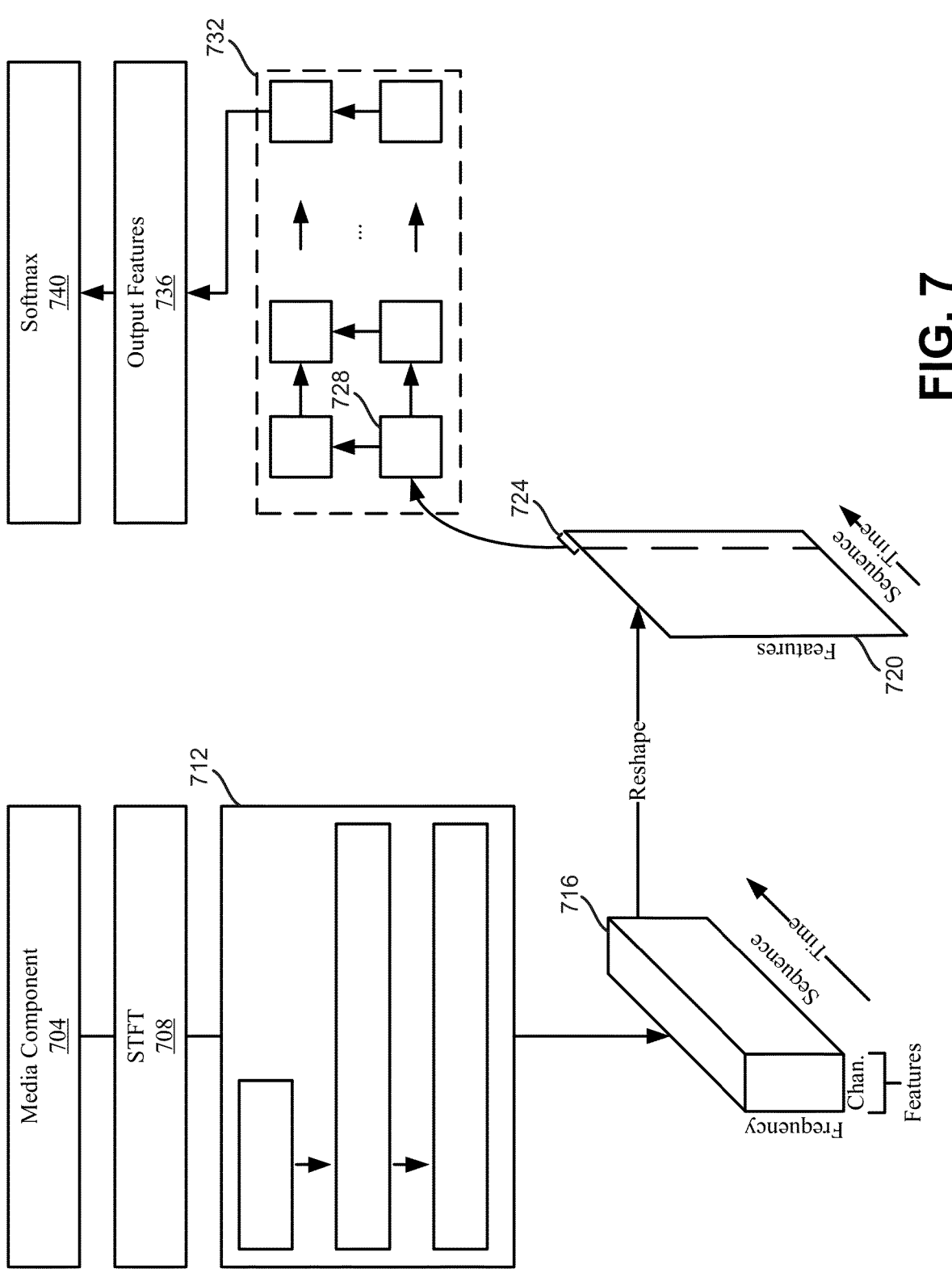
FIG. 7 illustrates an example process flow during execution of an AI processor configured to detect a media type of media within a media stream according to aspects of the present disclosure.

FIG. 7 illustrates an example process flow during execution of an AI processor configured to detect a media type of media within a media stream according to aspects of the present disclosure. Media component 704 may be received and processed by an AI processor (e.g., such as AI processor 120 as previously described). Media component may include, but is not limited to a media stream, a portion of a media stream, a component of a media stream (e.g., such as the video component, the audio component, one or more other components, and/or the like), metadata associated with the media component, combinations thereof, or the like. In some instances, a media stream may include various content presented within a communication channel configured for presentation by a device (e.g., such as a computing device, display device, media device, and/or the like). Examples of media streams include, but are not limited to, a broadcast television channel, cable television channel, Internet media, and/or the like.

The AI processor may process media component 704 using STFT 708. STFT 708 may define a set of media segments from media component 704 in a frequency domain. Media component 704 may be in a time domain such that each discrete instance of media component 704 may correspond to a point in time of the media stream. STFT 708 may define a set of media segments from media component 704 with each media segment corresponding to a contiguous portion of the media component within a time interval (e.g., a window value).

In some instances, the set of media segments may represent non-overlapping portions of the entire media component 704. For instance, if the window value is set to 500 milliseconds, a first media segment may correspond to the media of the media stream from T=0 ms to T=500 ms and a next media segment may correspond to the media of the media stream from T=500 ms to T=1000 ms, such that the set of media segments do not exclude a portion of media component 704.

In other instances, the AI processor defines a step value indicating a distance between the beginning of a first media segment and the beginning of a next media segment. When the step value is less than the window value, the media segments may overlap. For example, for a window value of 500 ms and a step value of 100 ms, a first media segment may correspond to the portion of media component 704 from T=0 ms to T=500 ms and a next media segment may correspond to the portion of media component 704 from T=100 ms to T=600 ms. The step size may be predetermined, based on input, based on a previous execution of the process of FIG. 10, based on a previous execution of one or more machine-learning models (such as any of the machine-learning models described herein), based on other machine-learning models, and/or the like. In these instances, the step value may be less than or equal to the window value.

In other instances, the step value may be less than, equal to, or greater than the window value. When the step value is greater than the window value, the set of media segments may not include the entire media component 704. For example, a first media segment may correspond to the media of the media stream from T=0 ms to T=500 ms and a next media segment may correspond to the media of the media stream from T=750 ms to T=1250 ms. The computing device may skip a portion of the media stream between each media segment (e.g., such as the portion of media component 704 from T=501 ms to T=749 ms in the previous example). The time interval between each media segment may be predetermined, based on input, based on a previous execution of the process of FIG. 10, based on a previous execution of one or more machine-learning models (to be described in connection to blocks 1012 and 1016), based on other machine-learning models, and/or the like.

Once the set of media segments are defined, STFT 708 may then convert the set of media segments into the frequency domain (e.g., using a Fourier-based transform, or the like). STFT 708 may operate on a portion of the media component, the entire media component, continuously (e.g., for continuously received media), and/or the like.

AI processor may generate a feature vector for each media segment using a machine-learning model. For instance, AI processor may use neural network 712 to generate one or more feature vectors for each media segment of the set of media segments. The neural network may be, for example, a convolutional neural network that includes at least three layers: an input layer, one or more hidden layers, and an output layer. The neural network may include a kernel used to convolve the input to a node of the neural network. In some instances, the kernel may be a 3×3 kernel. In other instances, the kernel may be of any size including single row or single column sizes.

The output from neural network 712 may be three-dimensional feature vector 716. Feature vector 716 may include, in some examples, a time-dimension, a frequency-dimension, and a channel dimension (e.g., features per time and frequency). AI processor may determine whether feature vector 716 is in a format that is compatible with the next processing layer (e.g., neural networks 732). If feature vector 716 is not compatible, then the AI processor may modify the format of feature vector 716 into a format that is compatible. For instance, the AI processor may determine that the next processing layer may be configured to receive a two-dimensional input. The three-dimensional feature vector may be modified into a two-dimensional format that can be input to the next processing layer.

Modify feature vector 716 into a two-dimensional feature vector may include unfolding and reshaping feature vector 716. Feature vector 716 may be unfolded by stacking the third-dimension of the feature vector onto the second-dimension of the feature vector (e.g., appending the feature set at each frequency with the features of the third-dimension of that frequency). The unfolded feature vector may then be reshaped in strides of a particular length (e.g., such as predetermined time interval or a length of the media segment or the like). The result of the unfolded and reshaped feature vector 716, is feature vector 720, which includes two-dimensions: a time-dimension and a frequency-dimension.

Alternatively, or additionally, a dimensionality reduction may be executed on feature vector 716 or feature vector 720. Examples, of dimensionality reduction process include, but are not limited to, principle component analysis, a discriminant analysis, or the like. Dimensionality reduction may operate to transform feature vector 716 or feature vector 720 into a lower-dimensionality space while retaining as many predictive features as possible.

The strides may be extracted from feature vector 720 and passed to neural network 732. A stride may correspond to a portion of feature vector 720 such as a set of features over the particular length (e.g., time interval). The particular length may be predetermined, selected by user input, based on historical executions of neural network 732, based on an accuracy metric of neural network 732, based on an output of an optimization function that analyzes changes in an output of neural network 732 when varying the length, other machine-learning models, and/or the like. As shown, stride 724 may be extracted from feature vector 720 and passed to neural network 732.

Neural network 732 may be configured to predict a presence of a boundary in a temporal slice and/or feature vector 720. Neural network 732 may also be configured to predict a content type of content represented by the temporal slice and/or feature vector 720. Alternatively, neural network may include two or more neural networks. A first neural network may be configured to predict the presence of the boundary in the temporal slice and/or feature vector 720 and a second neural network may be configured to predict a content type of content represented by the temporal slice and/or feature vector 720. The neural networks may be of a same type trained using a same, similar, or different training dataset or of a different type. In some instances, the neural networks may be recurrent neural networks such as long-short term memory networks. Neural network 732 output one or more probabilities such as a first probability that a boundary is present and a second probability that the content type corresponds to a particular content type. The probabilities may be represented by a value between zero and 1, a percentage between 0 and 100, and/or the like. In a multiple neural network configuration, each neural network may be trained to generate a corresponding probability. Alternatively, neural network 732 may output a single value representative of the first probability and the second probability.

The LSTM networks described herein may be a two layered neural network, the first layer of which includes a set of nodes. The set of nodes may include any quantity nodes determined by historical executions of neural networks described herein, training data, the media stream, feature vector 720, the stride length, the quantity of strides extracted from feature vector 720, user input, or the like. In some examples, the set of nodes may include 64 nodes. Each node may include a specialized neural network. Each node may process a different portion of feature vector 720. For instance, a sequence of nodes may process a corresponding sequence of strides from feature vector 720.

An LSTM node may include gates that may control how data is input, stored, and/or output from the node. For example, LSTM node 728 may receive the current long-term memory (e.g., derived data retained from execution of each cell preceding this cell), a previous hidden state (e.g., the output from the immediately previous node), and/or the input data at this current timestep. LSTM node 728 may use a first gate to weight bits of the current long-term memory. The weights may cause portions of the current long-term memory to be "forgotten" (e.g., weighted lower so as to reduce an impact on the output of this node, the output of the LSTM network, and on the processing of future nodes). Next, the LSTM network may use an input gate that uses the previous hidden state and the input data to determine what information from the previous hidden state and the input data is to be added to the current long-term memory. The LSTM network may then use an output gate that generates a new hidden state for the next node the LSTM network and determines a degree with which to update the long-term memory. Each gate may include a sigmoid and/or hyperbolic tangent function that activates a neural network configured to perform the aforementioned operations. The LSTM the output from the final node of the LSTM may be an output layer (e.g., such as a linear layer, etc.) that converts the output from the final node into a prediction.

The long-term memory may pass through a sequence of nodes of the LSTM network, with each node weighting the data received in the long-term memory, determining whether to add additional data to the long-term memory, and updating the data of the long-term memory before it is passed to a next node of the LSTM network. As a result, the long-term memory enables the LSTM network to learn from previous inputs of a time-series dataset. For instance, when processing a sequence of media segments, the long-term memory enables the LSTM to use data from the first input (e.g., the first media segment in the sequence), when processing the last input (e.g., the last media segment in the sequence).

The output from neural network 732 may include output features 736 derived from the LSTM network. In some instances, output features 736 may include an n-member vector, z of K features (e.g., real numbers). K may be equal to a quantity of nodes of the LSTM network. In LSTM configuration with 64 nodes, K may equal 64. The n-member vector may be passed as input into SoftMax process 740. The SoftMax process may normalize the z into a probability distribution consisting of K probabilities proportional to the exponentials of the input numbers. The output of the Soft-Max process may be a vector z' with K features, where the features in z' are between 0 and 1 and together add up to 1. Each feature of z' may be interpreted as a probability.

The standard (unit) SoftMax function $\sigma$: $R^K \rightarrow [0, 1]^K$ is defined by the formula:

$$\sigma(z)_i = \frac{e^{z_i}}{\sum_{j=1}^{K} e^{z_j}} \text{ for } i = 1, \dots, K \text{ and } z = (z_1, \dots, z_K) \in \mathbb{R}^K.$$

The SoftMax process applies the standard exponential function to each element $z_i$ of the input vector z and normalizes these values by dividing by the sum of all these exponentials. This normalization ensures that the sum of the components of the output vector $\sigma(z)$ is 1. The SoftMax output, z' may be a set of probabilities for each stride 724 of feature vector 720. A single probability may be derived from the set of probabilities of each stride. The single probability may be representative of the output of neural network 732. For example, a neural network configured to predict the presence of a boundary in feature vector 720 and/or a stride may output a probability that the boundary is present. A neural network configured to predict the content type of content represented by the feature vector 720 and/or the stride extracted from feature vector 720 may output a probability that the content corresponds to a particular content type.

Figure 8:
FIG. 8 illustrates an example output from an AI processor detecting a particular media type of media within a media stream according to aspects of the present disclosure.

FIG. 8 illustrates example outputs from an AI processor detecting a particular media type of media within a media stream according to aspects of the present disclosure. The outputs 800 of the AI processor may include two or more probabilities for each media segment. For example, the outputs for each media segment include an identification of the time interval 804 of the media stream represented by the media stream, a first probability 808 that corresponds to whether the media segment includes content of a particular content type, and a second probability 812 that corresponds to whether the media segment includes a boundary. The time interval 804 of each media segment may be 500 millisec-onds of the media stream.

The AI processor first identifies a first media segment including a first boundary and a second media segment including a second boundary. The AI processor may identify the first media segment having a second probability 812 that is greater than a first threshold (such as 85%, though the first threshold may be selected by other means such as user input, historical executions of AI processor, machine-learning models described herein, etc.) and a second media segment having a second probability 812 that is greater than the first threshold. The AI processor then identifies a subset of media segments positioned between the first media segment and the second media segment (e.g., shown by 816a and 816b) and processes the first and/or second probabilities of the subset of media segments. For example, AI processor may determine if the average of the first probabilities 808 of the media segments between 816a and 816b are greater than a second threshold (e.g., 60%, though the second threshold may selected by other means such as user input, historical executions of AI processor, machine-learning models described herein, etc.). If the average probability of the first probabilities 808 of the subset of media segments is greater than the second threshold, then the AI process determines that the subset of media segments includes content of the particular content type. Alternatively, the AI processor may determine whether the median or mode of the probabilities of the subset are greater than the second threshold to determine if the subset of media segments includes content of the particular content type.

The AI processor may output an indication that content corresponding to the particular content type has been detected (or presented by a media device), an identification of a time offset that indicates a location within the media stream of the content, an identification of the media seg-ments in the subset of media segments, the subset of media segments, an identification of the media stream, information associated with the media device that presented the content or a user thereof (e.g., such as hardware components, software components, demographic information, etc.), a timestamp indicating a time in which the content was presented, a timestamp indicating a time in which the AI processor detected the content, combinations thereof, or the like.

Figure 9:
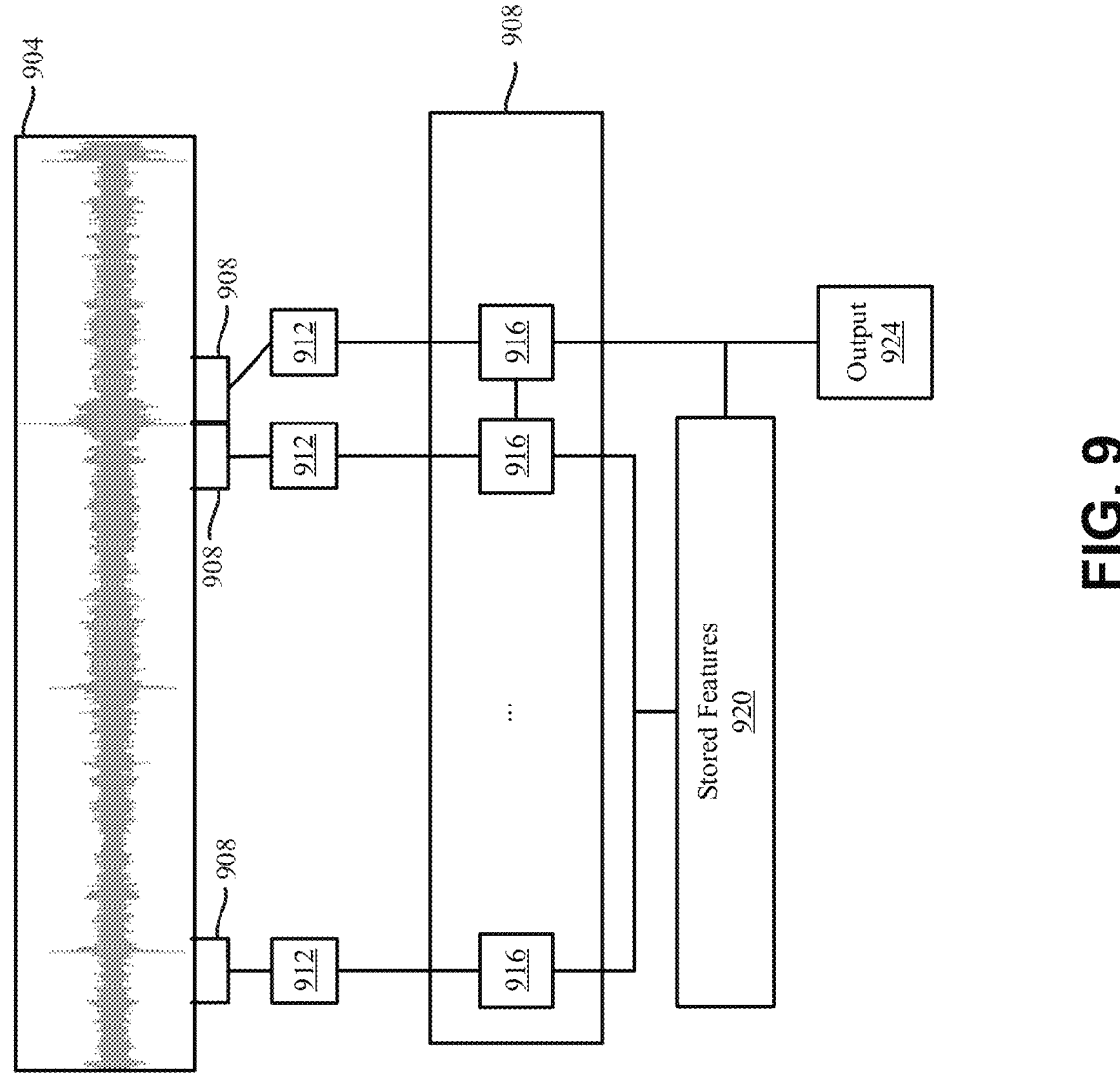
FIG. 9 illustrates an example execution of an AI processor on an audio component of a media stream according to aspects of the present disclosure.

FIG. 9 illustrates an example execution of an AI processor on an audio component of a media stream according to aspects of the present disclosure. Audio component 904 may be time-series data that can be represented (as shown) as pressure over time. Audio component 904 may be a media stream or a component of a media stream that includes additional components (e.g., such as video, etc.). Audio component 904 may be processed by an AI processor to determine the presence of content that corresponds to a particular content type (e.g., such as an advertisement, movie, television show, music, etc.).

The AI processor may first generate a sequence of media components 908 from audio component 904. Each media component may correspond to the portion of audio component 904 over a particular time interval (e.g., referred to as a window length) of audio component 904. In some instances, each media component 908 may represent a unique portion of audio component 904 such that media components may include non-overlapping portions of audio component 904. In other instances, media components may include overlapping portions of audio component 904. In those instances, the AI processor may include a step value indicative of a time interval between a start of a first media segment and a start of a next media segment. When the step value is less than the window value, then the media segments may overlap. When the step value is equal to the window value, the media segments may not overlap, but may cover the entire audio component 904. When the step value is greater than the window value, there may be a gap between each media segment that may not be processed by the AI processor. A step value that is greater than the window value may reduce the quantity of media segments defined for audio component 904 (or a media stream) to be processed by the AI processor at the expense of accuracy (e.g., one of the gaps may include a boundary that may be missed by the AI processor).

The media segments may be translated into the frequency domain by transform 912. In some instances, the transform may be a Fourier-based transform (e.g., such as a Fourier transform, fast Fourier transform, short-time Fourier transform, or the like). The transformed media segments may then be input to LSTM network 908. LSTM network 908 may be a two-layer neural network. The first layer may include a sequence of nodes 916. In some instances, the quantity of nodes 916 in the sequence of nodes 916 may correspond to a quantity of media segments defined from audio component 904. Each node 916 may process a media segment of the sequence of media segments and generate a first output of features stored in stored features 920, a second output that is passed to the next node in the sequence of nodes 916, and a third output represent a long-term memory of the LSTM 908. The long-term memory may be accessible to each node 916 in the sequence. While processing a media segment, each node 916 may add, remove, and/or update the data of the long-term memory. By the time the last node in the sequence process the last media segment in the sequence of media segments, the long-term memory may store data representing what the LSTM network 908 has learned processing the preceding media segments.

Stored features 920 stores the probabilities output from each node 916 of LSTM network 908. The probabilities may correspond to a first probability that a media segment includes a boundary and a second probability that the media segment includes content corresponding to a particular content type. The first probability may be generated by a first LSTM network 908 and the second probability may be generated by a second LSTM network 908 (having a similar or same structure and operation but a different configuration and/or training). Alternatively, the first and second probabilities may be generated by the same LSTM network 908. Each node 916 may output the first and second probabilities with respect to the media segment processed by that node.

The output of the final node and stored features 920 may be used to generate an output prediction 924. The AI processor may first identify a first media segment and a second media segment that each include a boundary. A media segment may be determined to include a boundary when the boundary probability output from a node that processed the media segment is greater than a first threshold. The AI processor may identify a subsequence of media segments that corresponds to the media segments in the sequence that are positioned between the first media segment and the second media segment. The AI processor may then determine the average of the content probabilities (e.g., the probability that the content of a media segment corresponds to a particular content type) of the subsequence of media segments is greater than a second threshold. If so, then prediction output 924 may indicate that the subsequence of media segments includes content of the particular content type. If the average of the probabilities is less than the threshold, then prediction output 924 may indicate that the subsequence of media segments does not include content of the particular content type.

FIG. 10 illustrates a flowchart of an example process for detecting a media type of media within a media stream according to aspects of the present disclosure. At block 1004, a media stream may be received by a computing device. In some instances, the computing device may be a media device such as a display device (e.g., a television, monitor, etc.), set-top box (e.g., that receives cable television, satellite television, Internet-based streaming media, etc.), a desktop or laptop computer, a mobile device (e.g., such as a smartphone, personal digital assistant, etc.), radio, server, and/or the like. In one example, the computing device may be a television such as a smart television that may be configured to present the media to a user. The computing device may receive the media stream in real-time (as the media is being transmitted from a media source) or from a storage device (e.g., such as local or remote memory, one or more databases, and/or the like. The media stream may include a video component and/or an audio component.

At block 1008, the computing device may define a set of media segments, with each media segment representing a portion of the media stream. The computing device may define the set of media segments by sampling the media stream. In some instances, the computing device may store a predetermined portion of the media stream as the media stream is received by the computing device in memory (e.g., such as cache or other local memory). The computing device may then sample the portion of the media stream stored in memory. In other instances, the computing device may sample the media stream in real time as the media stream is received by the computing device.

Each media segment may represent a portion of the media stream or a component thereof within a particular time interval. For example, each media segment may represent the a portion of the media stream, an audio component of the portion of the media stream, a video component of the portion of the media stream, another component of the portion of the media stream, or the like. The particular time interval may be selected based on input, from a previous execution of the process of FIG. 10, from a previous execution of one or more machine-learning models (to be described in connection to blocks 1012 and 1016), other machine-learning models, and/or the like. In some examples, the particular time interval may be 500 milliseconds of the media stream. In other examples, the particular time interval may be 8 seconds. The particular time interval may be any time interval.

The set of media segments may represent discrete, sequential portions of the media stream. In some instances, the set of media segments may represent non-overlapping portions of the entire media stream. For instance, if the particular time interval is set to 500 milliseconds, a first media segment may correspond to the media of the media stream from T=0 milliseconds to T=500 milliseconds and a next media segment may correspond to the media of the media stream from T=500 milliseconds to T=1000 milliseconds. The computing device may define the set of media segments such that the media segments represent the entire media stream and that the media segments do not overlap.

In other instances, the computing device may define the set of media segments such that the media segments cover a portion of the media stream. For example, a first media segment may correspond to the media of the media stream from T=0 milliseconds to T=500 milliseconds and a next media segment may correspond to the media of the media stream from T=750 milliseconds to T=1250 milliseconds. The computing device may skip a portion of the media stream between each media segment. The time interval between each media segment may be predetermined, based on input, based on a previous execution of the process of FIG. 10, based on a previous execution of one or more machine-learning models (to be described in connection to blocks 1012 and 1016), based on other machine-learning models, and/or the like.

In still yet other instances, the computing devices may define the set of media segments such that the media segments overlap based on a step size For example, for a particular time interval of 500 milliseconds and a step size of 100 milliseconds, a first media segment may correspond to the media of the media stream from T=0 milliseconds to T=500 milliseconds and a next media segment may correspond to the media of the media stream from T=100 milliseconds to T=600 milliseconds. The step size may be predetermined, based on input, based on a previous execution of the process of FIG. 10, based on a previous execution of one or more machine-learning models (to be described in connection to blocks 1012 and 1016), based on other machine-learning models, and/or the like.

The computing device may execute a transform to convert the set of media segments from the time domain into the frequency domain. For instance, the computing device may execute a Fourier transform (e.g. such as, but not limited to a fast Fourier transform or the like. Alternatively, the computing device may execute a Short-Time Fourier Transform (STFT). STFT may be a process that outputs a set of media segments in the frequency domain. The computing device may execute the STFT process in place of defining the set of media segments and translating the media segments into the frequency domain as the STFT process may provide analogous functionality. The STFT process may receive, as input, the media stream (or a portion thereof) and one or more of an indication of the particular time interval, an indication as to whether the media segments are to overlap, an indication as to whether if a time interval gap is to occur between each media segment, and the like.

At block 1012, the computing device may identify a first media segment of the set of media segments representative of a first boundary and a second media segment of the set of media segments representative of a second boundary. The computing device may derive one or more feature vectors for each media segment of the set of media segments. In some examples, the computing device may execute a first machine-learning model using the media segment as input. The first machine-learning model may be, but is not limited to, a neural network, recurrent neural network such as, but not limited to a long-short term memory, concurrent neural network, Naïve Bayes classifier, support vector machine, combinations thereof (e.g., such as an ensemble model, an adversarial network, etc.), or the like.

The first machine-learning model may output one or more two or three-dimensional feature vectors based on the media segment. The first machine-learning model may be trained using historical media segments using unsupervised learning or supervised learning. When using supervised learning, each historical media segment may include one or more labels (e.g., features, feature vectors, etc.). The first machine-learning model may use the labels to determine which features to extract from an input media segment.

If the feature vectors output from the first machine-learning model are incompatible with subsequent processing stages (e.g., such as other machine-learning models that may be used to generate predictions using the feature vectors, then the feature vectors may be further converted into a form usable by the next processing stage. For example, the output of the first machine-learning model may be three-dimensional feature vector and the next processing stage (e.g., a second machine-learning model) may be configured to receive a two-dimensional feature vector. Converting the three-dimensional feature vector into a two-dimensional feature vector may include unfolding and reshaping the three-dimensional feature vector to form a two-dimensional feature vector. The three-dimensional feature vector may be unfolded by stacking the features in the third-dimension of the feature vector onto the second-dimension of the feature vector (e.g., stacking the features in the z-dimension onto the features in the y-dimension, or the like of an x, y, z three-dimension space). The unfolded feature vector may then be reshaped in strides of a particular length (e.g., such as predetermined time interval or window value as previously described). The unfolded and reshaped feature vector may be a two-dimensional representation of the three-dimensional feature vector.

The one or more feature vectors may be passed as input into a second machine-learning model configured to predict a presence of a boundary within the media segment from which the one or more feature vectors were derived. The second machine-learning model may output a probability that the input feature vector includes a boundary. If the probability is greater than a threshold (such as, but not limited to, 80%, 90%, or the like), then the computing device may determine that a boundary is present in the media segment corresponding to the input feature vector. The threshold may be predetermined, learned over time (e.g., by the second machine-learning model, other machine-learning models, or the like), selected based on user input, and/or the like.

The second machine-learning model may be a neural network configured to process time-series data such as, but not limited to, a recurrent neural network, a deep learning neural network, a long-short term memory network, or the like). In some instances, the second machine-learning model may include other types of machine-learning models such as Naïve Bayes classifiers, support vector machines, a regression-based model, decision trees, etc. The second machine-learning model may be trained using historical media segments in a supervised or self-supervised learning. In supervised learning, each training input may include a label corresponding to an expected output. The second machine-learning model adjusts internal weights of nodes based on a difference between the output generated by the second machine-learning model and the expected output. In self-supervised learning, the training data may be unlabeled. The second machine-learning model may learn by analyzing the structure of the training data (e.g., correlations, etc.). The analysis may be fed back into the second machine-learning model to adjust the internal weights of the nodes.

In some instances, the second machine-learning model may be further trained using reinforcement learning. Reinforcement learning uses the output of the machine-learning model and a label or value to determine the accuracy of that output. For example, the output of the second machine-learning model may be evaluated by a third machine-learning model, user input, or the like. The output and the evaluation may be passed as feedback to the second machine-learning model to further adjust the node weights of the second machine-learning model. Reinforcement learning may occur during training of the machine-learning model, during regular operation of the second machine-learning model (e.g., after the second machine-learning model is trained), during retraining of the second machine-learning model, etc.

The second machine-learning model may be configured to detect a present of a boundary in a media segment. A boundary may correspond to one or more frames that form a contextual transition in the media stream such as, for example, a transition from a first media type (e.g., a movie, etc.) to a second media type (e.g., an advertisement, etc.) or from the second media type to the first media type. The second machine-learning model may continue processing the set of media segments until the second machine-learning model detects the first media segment representative of the first boundary and the second media segment representative of the second boundary. Alternatively, the second machine-learning model may continue processing media segments until there are no more media segments to process (e.g., the set of media segments is empty and/or the media stream is terminated).

In some examples, other processes (e.g., in addition to or in place of the second machine-learning model) and/or users may also be used to detect the first media segment representative of the first boundary and the second media segment representative of the second boundary. In those examples, the other process may include processes that analyze video frames, audio, or components thereof to determine the presence of a boundary. For example, a boundary may be detected upon detecting one or more adjacent video frames having an average pixel value that is approximately zero (e.g., black), detecting adjacent video frames with a large variation in average pixel values (e.g., a video frame with an average pixel value of approximately zero adjacent to a video frame with an average pixel value greater than a threshold, combinations thereof, or the like. Audio may be similarly analyzed to detect boundaries. For example, frequency and/or amplitude analysis of the audio component of the media stream may indicate the presence of a boundary by detecting variations in frequency and/or amplitude (e.g., volume) between adjacent time segments that are greater than a threshold.

At block 1016, the computing device may generate, for at least one media segment of the set of media segments, a prediction corresponding to whether the at least one media segment corresponds to a particular content type. The computing device may predict a media type corresponding to a media segment of the set of media segment using the one or more feature vectors derived from the media segment (e.g., a same input passed to the second machine-learning model). In some examples, the second computing device may use a third machine-learning model (e.g., such as a neural network, recurrent neural network such as, but not limited to a long-short term memory, concurrent neural network, Naïve Bayes classifier, support vector machine, etc.) configured to predict a media type of an input feature vector. The third machine-learning model may be of a same or different type as the second machine-learning model. The third machine-learning model may output a probability that the input feature vector corresponds to the particular content type. If the probability is greater than a threshold (such as, but not limited to, 55%, 60%, 65%, or the like), then the computing device may determine that the media segment corresponding to the input feature vector includes content of the particular content type. The threshold may be predetermined, learned over time (e.g., by the third machine-learning model or other machine-learning models, etc.), selected based on user input, and/or the like.

The third machine-learning model may be trained using supervised or self-supervised learning as previously described in connection to the second machine-learning model of block 1012. In supervised learning, the third machine-learning model may be trained using historical media segments and labels that correspond to an expected output (e.g., an indication of a media type corresponding to the training input). In some examples, the second machine-learning model and the third machine-learning model may be trained using a same training dataset. In those examples, if supervised learning is used, the labels corresponding to the training dataset may be different. For example, the labels assigned to the second machine-learning model may correspond to whether a given training input includes a boundary (or not), and the labels assigned to the third machine-learning model may correspond to a media type of a given training input.

At block 1020, the computing device determines that a subset of the set of media segments that includes media segments between the first media segment and the second media segment correspond to the particular content type based on the first boundary, the second boundary, and the prediction. In some instances, the computing device may use the output of the third machine-learning model to determine that a subset of the set of media segments correspond to the particular content type. For example, if the third machine-learning model outputs a probability for each of one or more adjacent media segments that is greater than a threshold, then the computing device may determine that the one or more media segments correspond to the particular content type.

The computing device may use the output of the second machine-learning model with the output of the third machine-learning model to improve an accuracy of the determination that one or more media segments correspond to the particular content type. For example, the computing device may use the second machine-learning model to identify a subset of media segments of the set of media segments positioned between two boundaries (e.g., media segments between the first media segment representing the first boundary and the second media segment representing the second boundary). The computing device may then determine if the output probability of each media segment of the subset of media segments from the third machine-learning model is greater than the threshold (e.g., the threshold of the third machine-learning model described in block 1016). In some instances, the computing device may use the average of the probabilities of the subset of media segments. For example, if the average of the probabilities output by the third machine-learning model for the subset of media segments is greater than the threshold (such as, but not limited to, 55%, 60%, 65%, or the like), then the computing device may determine that the subset of media segments corresponds to the particular content type. In other instances, the computing device may use the minimum probability, the maximum probability, the median value, the mode, the range, combinations thereof, or the like. For example, the computing device may use the range and the maximum. If the range is below a threshold (e.g., indicating low variability) and the maximum is greater than a threshold (or the minimum is greater than the threshold), then it can be determined that the subset of media segments correspond to the particular content type.

In some instances, the computing device may use a temporal threshold in addition to the outputs from the second and third machine-learning models. For example, some content types may have limited presentation times. For example, advertisements may be displayed for a threshold time interval between zero and two minutes. The computing device verify that an indication that a subset of media segments corresponds to the particular content type by determining a time interval between the first media segment and the second media segment. If the time interval is greater than the threshold time interval, then the indication may be a considered a false positive. In that instance, the determination by the computing device may be discarded and/or used by the third machine-learning model for reinforcement learning.

Alternatively, or additionally, the computing device may use the threshold time interval when identifying the first media segment representative of the first boundary and the second media segment representative of the second boundary. For instance, the computing device may identify the first and second media segments as media segments with a probability indicative of a boundary that is greater than the threshold (of block 1012) which are not more than the threshold time interval apart from each other within the media stream. For example, the computing device may identify media segments representative of boundaries that are within the threshold time interval apart from each other within the media stream. If media segments representative of boundaries are further than the threshold time interval, then the computing device may continue processing until such media segments are detected.

At block 1024, the computing device may transmit an indication that the subset of the set of media segments corresponds to the particular content type. The transmission may be addressed to a remote device such as, but not limited to, a content database, a server, an automated content recognition system, and/or the like. Alternatively, or additionally, the transmission may be addressed to a local component of the media device such, but not limited to, local non-volatile memory, a local database, cache memory, and/or the like. In some instances, the transmission may include the subset of media segments (e.g., the portion of the media stream corresponding to the particular content type).

In response to receiving the indication, the media corresponding to the subset of media segments may be identified. For example, an automated content recognition system (and/or a manual recognition system) may be used to identify the content corresponding to the subset of media segments. The identification may include an identifier (e.g., name, title, serial number, etc.) of the content, information associated with the content (e.g., product, company, actors, production personnel, set, setting, metadata, trivia, etc.), and/or the like. The identifier (and/or information associated with the content) may be transmitted to the computing device, the media device configured to display the content and/or media stream, to a database configured to store an indication that the content was displayed, and/or the like. The transmission may include information associated with the media device that displayed or presented the content such as demographic information, software/hardware components of the media device, user information, and/or the like.

Figure 11:
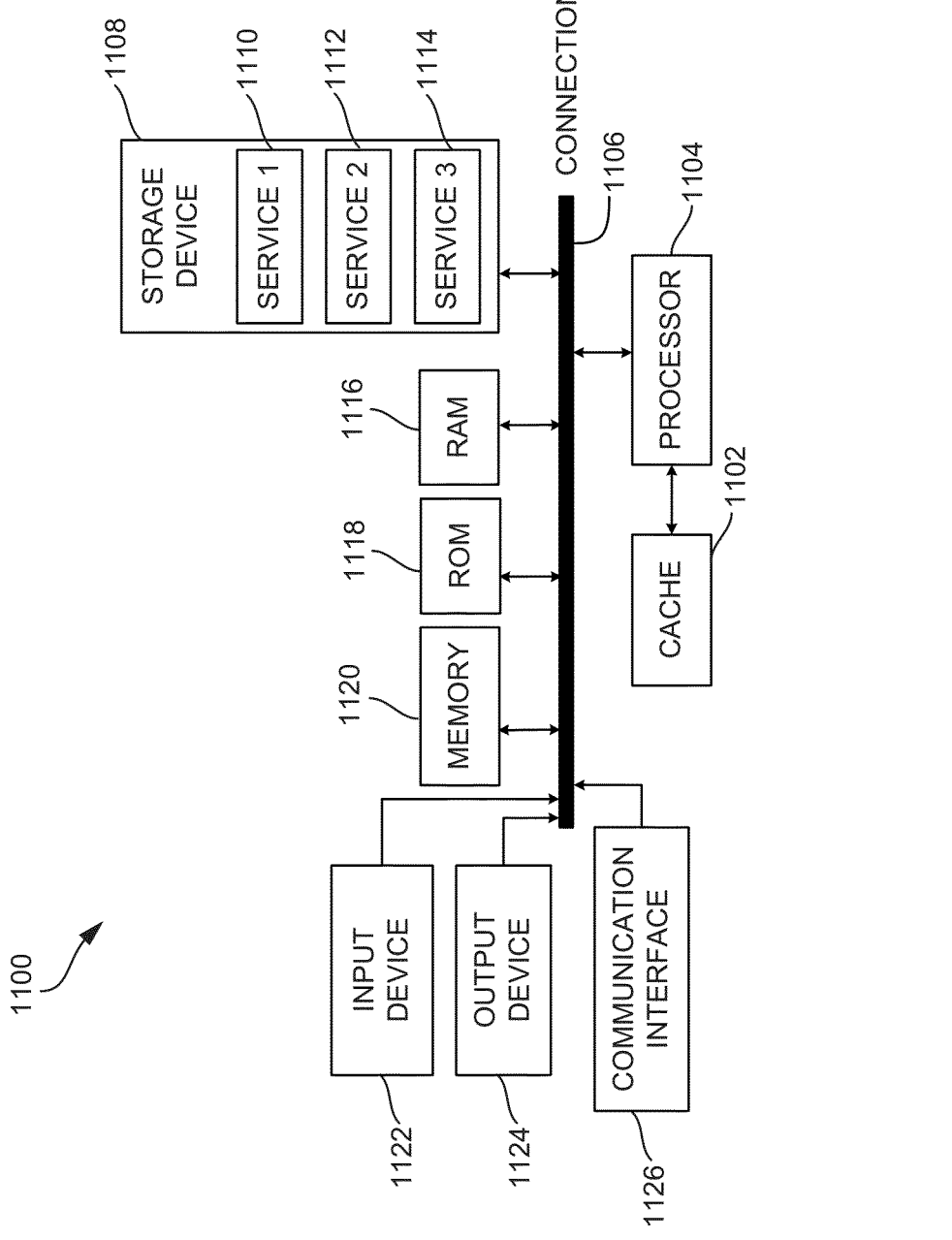
FIG. 11 illustrates an example computing device architecture of an example computing device that can implement the various techniques described herein according to aspects of the present disclosure.

FIG. 11 illustrates an example computing device according to aspects of the present disclosure. For example, computing device 1100 can implement any of the systems or methods described herein. In some instances, computing device 1100 may be a component of or included within a media device. The components of computing device 1100 are shown in electrical communication with each other using connection 1106, such as a bus. The example computing device architecture 1100 includes a processor (e.g., CPU, processor, or the like) 1104 and connection 1106 (e.g., such as a bus, or the like) that is configured to couple components of computing device 1100 such as, but not limited to, memory 1120, read only memory (ROM) 1118, random access memory (RAM) 1116, and/or storage device 1108, to processing unit 1110.

Computing device 1100 can include a cache 1102 of high-speed memory connected directly with, in close proximity to, or integrated within processor 1104. Computing device 1100 can copy data from memory 1120 and/or storage device 1108 to cache 1102 for quicker access by processor 1104. In this way, cache 1102 may provide a performance boost that avoids delays while processor 1104 waits for data. Alternatively, processor 1104 may access data directly from memory 1120, ROM 817, RAM 1116, and/or storage device 1108. Memory 1120 can include multiple types of homogenous or heterogeneous memory (e.g., such as, but not limited to, magnetic, optical, solid-state, etc.).

Storage device 1108 may include one or more non-transitory computer-readable media such as volatile and/or non-volatile memories. A non-transitory computer-readable medium can store instructions and/or data accessible by computing device 1100. Non-transitory computer-readable media can include, but is not limited to magnetic cassettes, hard-disk drives (HDD), flash memory, solid state memory devices, digital versatile disks, cartridges, compact discs, random access memories (RAMs) 1125, read only memory (ROM) 1120, combinations thereof, or the like.

Storage device 1108, may store one or more services, such as service 1 1110, service 2 1112, and service 3 1114, that are executable by processor 1104 and/or other electronic hardware. The one or more services include instructions executable by processor 1104 to: perform operations such as any of the techniques, steps, processes, blocks, and/or operations described herein; control the operations of a device in communication with computing device 1100; control the operations of processing unit 1110 and/or any special-purpose processors; combinations therefor; or the like. Processor 1104 may be a system on a chip (SOC) that includes one or more cores or processors, a bus, memories, clock, memory controller, cache, other processor components, and/or or the like. A multi-core processor may be symmetric or asymmetric.

Computing device 1100 may include one or more input devices 1122 that may represent any number of input mechanisms, such as a microphone, a touch-sensitive screen for graphical input, keyboard, mouse, motion input, speech, media devices, sensors, combinations thereof, or the like. Computing device 1100 may include one or more output devices 1124 that output data to a user. Such output devices 1124 may include, but are not limited to, a media device, projector, television, speakers, combinations thereof, or the like. In some instances, multimodal computing devices can enable a user to provide multiple types of input to communicate with computing device 1100. Communications interface 1126 may be configured to manage user input and computing device output. Communications interface 1126 may also be configured to managing communications with remote devices (e.g., establishing connection, receiving/ transmitting communications, etc.) over one or more communication protocols and/or over one or more communication media (e.g., wired, wireless, etc.).

Computing device 1100 is not limited to the components as shown if FIG. 11. Computing device 1100 may include other components not shown and/or components shown may be omitted.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored in a form that excludes carrier waves and/or electronic signals. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Some portions of this description describe examples in terms of algorithms and symbolic representations of operations on information. These operations, while described functionally, computationally, or logically, may be implemented by computer programs or equivalent electrical circuits, microcode, or the like. Furthermore, arrangements of operations may be referred to as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module can be implemented with a computer-readable medium storing computer program code, which can be executed by a processor for performing any or all of the steps, operations, or processes described.

Some examples may relate to an apparatus or system for performing any or all of the steps, operations, or processes described. The apparatus or system may be specially constructed for the required purposes, and/or it may comprise a general-purpose computing device selectively activated or reconfigured by a computer program stored in memory of computing device. The memory may be or include a non-transitory, tangible computer readable storage medium, or any type of media suitable for storing electronic instructions, which may be coupled to a bus. Furthermore, any computing systems referred to in the specification may include a single processor or multiple processors.

While the present subject matter has been described in detail with respect to specific examples, it will be appreciated that those skilled in the art, upon attaining an understanding of the foregoing, may readily produce alterations to, variations of, and equivalents to such embodiments. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

For clarity of explanation, in some instances the present disclosure may be presented as including individual functional blocks including functional blocks comprising devices, device components, steps or routines in a method embodied in software, or combinations of hardware and software. Additional functional blocks may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual examples may be described herein as a process or method which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not shown. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

Devices implementing the methods and systems described herein can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. The program code may be executed by a processor, which may include one or more processors, such as, but not limited to, one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A processor may be a microprocessor; conventional processor, controller, microcontroller, state machine, or the like. A processor may also be implemented as a combination of computing components (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein. Functionality described herein also can be embodied in peripherals or add-in cards. Such functionality can also be implemented on a circuit board among different chips or different processes executing in a single device, by way of further example.

The following examples illustrate various aspects of the present disclosure. As used below, any reference to a series of examples is to be understood as a reference to each of those examples disjunctively (e.g., "Examples 1-4" is to be understood as "Examples 1, 2, 3, or 4").

Example 1: A method comprising: receiving a media stream; defining, from the media stream, a set of media segments, each media segment representing a portion of the media stream; identifying a first media segment of the set of media segments representative of a first boundary and a second media segment of the set of media segments representative of a second boundary; generating, for at least one media segment of the set of media segments, a prediction corresponding to whether the at least one media segment corresponds to a particular content type; determining that a subset of the set of media segments that includes media segments between the first media segment and the second media segment correspond to the particular content type based on the first boundary, the second boundary, and the prediction; and facilitating a transmission including an indication that the subset of the set of media segments corresponds to the particular content type.

Example 2: The method of any of example(s) 1, wherein identifying the first media segment representative of a first boundary and the second media segment representative of a second boundary is performed by a machine-learning model.

Example 3: The method of any of example(s) 1-2, wherein identifying the first media segment representative of a first boundary and the second media segment representative of a second boundary includes: generating, from the set of media segments, a set of feature vectors using a convolutional neural network, wherein the set of feature vectors is usable to identify the first boundary and the second boundary.

Example 4: The method of any of example(s) 1-3, wherein at least one feature vector of the set of feature vector is reshaped into a two-dimensional representation of the features of the at least one feature vector.

Example 5: The method of any of example(s) 1-4, wherein generating a prediction comprising: executing a recurrent neural network using at least one media segment of the set of media segments.

Example 6: The method of any of example(s) 1-5, wherein defining the set of media segments includes: generating, from the media segments, a spectrogram, wherein the set of media segments are defined from the spectrogram.

Example 7: The method of any of example(s) 1-6, wherein media segments of the set of media segments correspond to an audio component of the media stream Example 8: The method of any of example(s) 1-7, further comprising: determining an identification of the content of the subset of the set of media segments.

Example 9: The method of any of example(s) 1-8, wherein identifying the first media segment representative of a first boundary and the second media segment representative of a second boundary is performed by a recurrent neural network.

Example 10: A system comprising: one or more processors; and a machine-readable storage medium storing instructions that when executed by the one or more processors, cause the one or more processors to perform operations of any of example(s) 1-9.

Example 11: A machine-readable storage medium storing instructions that when executed by one or more processors, cause the one or more processors to perform operations of any of example(s) 1-9.

In the foregoing description, aspects of the disclosure are described with reference to specific examples thereof, but those skilled in the art will recognize that the disclosure is not limited thereto. Thus, while illustrative examples of the disclosure have been described in detail herein, it is to be understood that the inventive concepts may be otherwise variously embodied and employed, and that the appended claims are intended to be construed to include such variations. Various features and aspects of the above-described disclosure may be used individually or in any combination. Further, examples can be utilized in any number of environments and applications beyond those described herein without departing from the broader spirit and scope of the disclosure. The disclosure and figures are, accordingly, to be regarded as illustrative rather than restrictive.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or media devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim(s).

The invention claimed is:

1. A system comprising:
one or more processors; and
a machine-readable storage medium storing instructions that when executed by the one or more processors, cause the one or more processors to perform operations including:
  defining a set of audio segments from an audio stream of media, each audio segment representing a portion of the audio stream;
  executing one or more neural networks, wherein the one or more neural networks generate, for each audio segment of the set of audio segments, a first probability that an audio segment corresponds to a boundary and a second probability that the audio segment corresponds to a content type;
  identifying a first audio segment associated with a first boundary and a second audio segment associated with a second boundary, wherein the first boundary and the second boundary define a media segment corresponding to a portion of the media between the first boundary and the second boundary;
  determining that the media segment corresponds to the content type based on the second probability of at least one audio segment between the first audio segment and the second audio segment and based on a time interval of the media segment being less than or equal to a threshold time interval, wherein the threshold time interval is defined based on the content type; and
  facilitating a transmission including an indication of the content type of the media segment.

2. The system of claim 1, wherein at least one neural network of the one or more neural networks is a recurrent neural network.

3. The system of claim 1, further comprising:
translating the set of audio segments into a frequency-domain representation of the set of audio segments, wherein the one or more neural networks are executed using the frequency-domain representation of the set of audio segments.

4. The system of claim 1, wherein defining the set of audio segments includes:
generating a spectrogram from a portion of the audio stream; and defining audio segments using a tensor derived from the spectrogram.

5. The system of claim 1, wherein determining that the media segment corresponds to the content type is further based on an average probability derived from the second probability of the first audio segment and the second probability of the second audio segment.

6. The system of claim 1, further comprising:
determining an identification of the media segment.

7. A method comprising:
defining a set of audio segments from an audio stream of media, each audio segment representing a portion of the audio stream;
executing one or more neural networks, wherein the one or more neural networks generate, for each audio segment of the set of audio segments, a first probability that an audio segment corresponds to a boundary and a second probability that the audio segment corresponds to a content type;
identifying a first audio segment associated with a first boundary and a second audio segment associated with a second boundary, wherein the first boundary and the second boundary define a media segment corresponding to a portion of the media between the first boundary and the second boundary;
determining that the media segment corresponds to the content type based on the second probability of at least one audio segment between the first audio segment and the second audio segment and based on a time interval of the media segment being less than or equal to a threshold time interval, wherein the threshold time interval is defined based on the content type; and
facilitating a transmission including an indication of the content type of the media segment.

8. The method of claim 7, wherein at least one neural network of the one or more neural networks is a recurrent neural network.

9. The method of claim 7, further comprising:
translating the set of audio segments into a frequency-domain representation of the set of audio segments, wherein the one or more neural networks are executed using the frequency-domain representation of the set of audio segments.

10. The method of claim 7, wherein defining the set of audio segments includes:
generating a spectrogram from a portion of the audio stream; and
defining audio segments using a tensor derived from the spectrogram.

11. The method of claim 7, wherein determining that the media segment corresponds to the content type is further based on an average probability derived from the second probability of the first audio segment and the second probability of the second audio segment.

12. The method of claim 7, further comprising:
determining an identification of the media segment.

13. A non-transitory computer-readable medium storing instructions that when executed by one or more processors, cause the one or more processors to perform operations including:
defining a set of audio segments from an audio stream of media, each audio segment representing a portion of the audio stream;
executing one or more neural networks, wherein the one or more neural networks generate, for each audio segment of the set of audio segments, a first probability that an audio segment corresponds to a boundary and a second probability that the audio segment corresponds to a content type;

identifying a first audio segment associated with a first boundary and a second audio segment associated with a second boundary, wherein the first boundary and the second boundary define a media segment corresponding to a portion of the media between the first boundary and the second boundary;

determining that the media segment corresponds to the content type based on the second probability of at least one audio segment between the first audio segment and the second audio segment and based on a time interval of the media segment being less than or equal to a threshold time interval, wherein the threshold time interval is defined based on the content type; and facilitating a transmission including an indication of the content type of the media segment.

14. The non-transitory computer-readable medium of claim 13, wherein at least one neural network of the one or more neural networks is a recurrent neural network.

15. The non-transitory computer-readable medium of claim 13, further comprising:

translating the set of audio segments into a frequency-domain representation of the set of audio segments, wherein the one or more neural networks are executed using the frequency-domain representation of the set of audio segments.

16. The non-transitory computer-readable medium of claim 13, wherein defining the set of audio segments includes:

generating a spectrogram from a portion of the audio stream; and defining audio segments using a tensor derived from the spectrogram.

17. The non-transitory computer-readable medium of claim 13, wherein determining that the media segment corresponds to the content type is further based on an average probability derived from the second probability of the first audio segment and the second probability of the second audio segment.

* * * * *